US011663822B2

(12) United States Patent
Deng et al.

(10) Patent No.: US 11,663,822 B2
(45) Date of Patent: May 30, 2023

(54) ACCURATE VIDEO EVENT INFERENCE USING 3D INFORMATION

(71) Applicant: Microsoft Technology Licensing, LLC, Redmond, WA (US)

(72) Inventors: Hongli Deng, Bellevue, WA (US); Joseph Milan Filcik, Redmond, WA (US); Hao Yan, Bellevue, WA (US); Tony Ducheng Jin, Seattle, WA (US); Gabriel Blanco Saldana, Kirkland, WA (US); Ryan Savio Menezes, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 254 days.

(21) Appl. No.: 17/103,264

(22) Filed: Nov. 24, 2020

(65) Prior Publication Data

US 2022/0164578 A1    May 26, 2022

(51) Int. Cl.
*G06V 20/40* (2022.01)
*G06T 7/80* (2017.01)
*G06V 40/10* (2022.01)
*G06V 20/64* (2022.01)

(52) U.S. Cl.
CPC ............... *G06V 20/40* (2022.01); *G06T 7/80* (2017.01); *G06V 20/647* (2022.01); *G06V 40/10* (2022.01); *G06T 2207/10016* (2013.01); *G06T 2207/30196* (2013.01); *G06V 20/44* (2022.01)

(58) Field of Classification Search
CPC ...... G06V 20/40; G06V 20/647; G06V 40/10; G06V 20/44; G06T 7/80; G06T 2207/10016; G06T 2207/30196
See application file for complete search history.

(56) References Cited

U.S. PATENT DOCUMENTS

| 9,165,190 | B2 | 10/2015 | Zhang et al. |
| 10,083,376 | B2 | 9/2018 | Kolavennu et al. |
| 2010/0194863 | A1* | 8/2010 | Lopes ...................... G06T 7/12 715/848 |

(Continued)

OTHER PUBLICATIONS

Sunghoon et al, ("3D Localization of Projected Objects for Surveillance", 2009 IEEE, pp. 1-6) (Year: 2009).*

(Continued)

*Primary Examiner* — Amara Abdi
(74) *Attorney, Agent, or Firm* — Workman Nydegger

(57) ABSTRACT

Techniques for inferring whether an event is occurring in 3D space based on 2D image data and for maintaining a camera's calibration are disclosed. An image of an environment is accessed. Input is received, where the input includes a 2D rule imposed against a ground plane. The 2D rule includes conditions indicative of an event. A bounding box is generated and encompasses a detected object. A point within the bounding box is projected from a 2D-space image plane of the image into 3D space to generate a 3D-space point. Based on the 3D-space point, a 3D-space ground contact point is generated. That 3D-space ground contact point is reprojected onto the ground plane of the image to generate a synthesized 2D ground contact point. A location of the synthesized 2D ground contact point is determined to satisfy the conditions.

17 Claims, 31 Drawing Sheets

(56) References Cited

U.S. PATENT DOCUMENTS

2017/0316578 A1 11/2017 Fua et al.

OTHER PUBLICATIONS

Ahmadyan, et al., "Real-Time 3D Object Detection on Mobile Devices with MediaPipe", Retrieved from: https://ai.googleblog.com/2020/03/real-time-3d-object-detection-on-mobile.html, Mar. 11, 2020, 05 Pages.

Deng, et al., "Amodal Detection of 3D Objects: Inferring 3D Bounding Boxes from 2D Ones in RGB-Depth Images", In Proceedings of the IEEE Conference on Computer Vision and Pattern, Jul. 21, 2017, 09 Pages.

Fang, et al., "3D Bounding Box Estimation for Autonomous Vehicles by Cascaded Geometric Constraints and Depurated 2D Detections Using 3D Results", In Repository of arXiv:1909.01867, Sep. 1, 2019, 11 Pages.

Ross, Daniel, "How-to: Hikvision Motion Detection Setup", Retrieved from: https://www.vueville.com/home-security/cctv/ip-cameras/hikvision-motion-detection-setup/, Jan. 27, 2020, 10 Pages.

Yu, et al., "Training-free Monocular 3D Event Detection System for Traffic Surveillance", In Repository of arXiv:2002.00137v1, Feb. 1, 2020, 06 Pages.

Guan, et al., "Extrinsic Calibration of Camera Networks Based on Pedestrians", In Journal of Sensors, vol. 16, Issue 5, May 9, 2016, 24 Pages.

Jung, et al., "3D Localization of Projected Objects for Surveillance", In Proceedings of the third ACM/IEEE International Conference on Distributed Smart Cameras, Aug. 30, 2009, 6 Pages.

"International Search Report and Written Opinion Issued in PCT Application No. PCT/US2021/056800", dated Mar. 1, 2022, 13 Pages.

Manafifard, et al., "A Survey on Player Tracking in Soccer Videos", In Journal of Computer Vision and Image Understanding, vol. 159, Jun. 2017, pp. 19-46.

\* cited by examiner

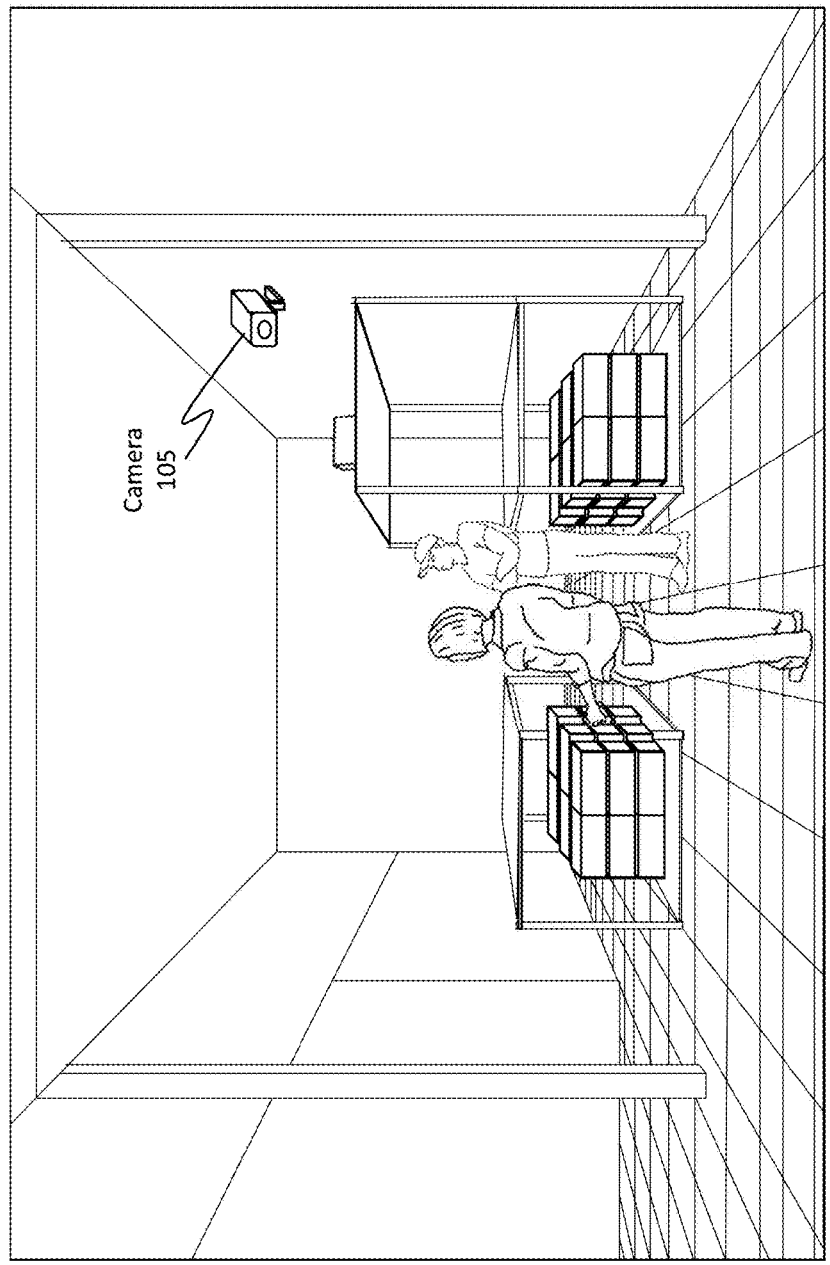
*Figure 1A*

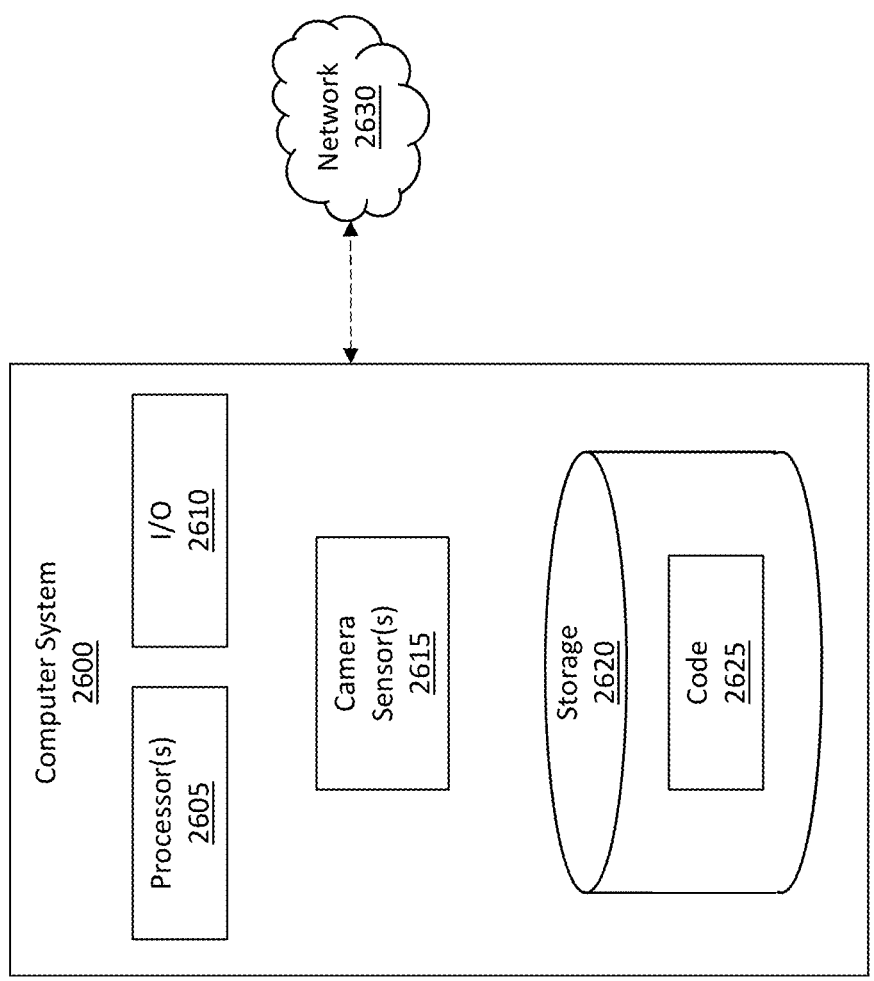

ACCURATE VIDEO EVENT INFERENCE USING 3D INFORMATION

BACKGROUND

Video monitoring is used in a plethora of different scenarios. For instance, video monitoring is used in traffic monitoring scenarios, in retail, in banking, and in numerous other situations. Often, these video monitoring systems rely on one or more cameras that are mounted to a fixed position and aimed in a manner to enable the camera's field of view (FOV) or frustum to cover a large area for monitoring purposes.

It is often highly beneficial to transform the events occurring in the two-dimensional (2D) image plane into the three-dimensional (3D) plane. For instance, consider a person crossing a road, or a vehicle entering an area, or a person perusing a retail store. Deducing these events in 3D space typically provides a more accurate and robust understanding of what actions are actually occurring as compared to trying to interpolate those actions in 2D space.

Numerous techniques are available to transform 2D data into 3D data. For example, a time of flight (ToF) range finder may be used to determine depths, which can then be used to interpret the 2D images captured by a camera. Similarly, stereoscopic depth matching can also be performed when two cameras are used to cover an overlapping field of view. Unfortunately, it is often the case that monitoring systems have only a single camera, or at least only a single camera per geographic area. For example, a specific portion of a retail store may be covered by only a single camera. As such, the above-described techniques for determining depth (and hence 3D information) are typically not available for monitoring systems. Instead of those other techniques, a different calibration process can be performed to calibrate a single camera to transform or map the 2D image plane to 3D space.

Some video monitoring and other video analytics applications require their cameras to be calibrated prior to use in order to acquire an accurate mapping between the 2D image plane and 3D space. One example calibration process involves placing an object with a known pattern into the camera's FOV. The camera then captures an image of the pattern and detects distortions of the pattern in the image. The system then compares the distortions in the image to the known characteristics of the pattern. These differences enable the system to determine both extrinsic calibration parameters (e.g., placement, orientation, etc.) and intrinsic calibration parameters (e.g., focal length, camera distortion, etc.) of the camera and enable the system to effectively calibrate the camera by determining the positional relationship of the camera relative to the environment as well as determining the operational features of the camera. After calibration, the camera system can interpolate distances and other qualities for objects included in newly acquired 2D images.

Once the camera is calibrated, the 2D images produced by that camera can be mapped into 3D space. Doing so enables the system to have a more robust understanding of the events that are being recorded by the camera. Although numerous benefits are achieved by performing these 2D to 3D mappings, there are still numerous challenges that occur. For instance, one challenge relates to ensuring the camera perpetually remains in a calibrated state. Sometimes, such as when the camera is moved, bumped, or otherwise disturbed, the original calibration of the camera may no longer be accurate. Therefore, it is highly desirable to ensure that the camera's calibration remains true and accurate. Another problem that occurs relates to how the calibrated camera system is able to deduce or infer whether events are transpiring in the environment. Accordingly, what is needed is an improved technique for maintaining a camera in a calibrated state and for accurately inferring the occurrence of an event in an environment.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments relate to systems, devices (e.g., hardware storage devices), and methods that are configured to infer whether an event is occurring in three-dimensional (3D) space based on two-dimensional (2D) image data. Some embodiments are also related to maintaining a camera in a calibrated state.

In some embodiments, an image of a scene is accessed. This image is generated by a camera that is located within an environment comprising the scene and that is calibrated relative to physical space coordinates of the environment. Input is received, where the input includes a 2D rule that is imposed against a ground plane represented within the image. The 2D rule includes conditions that, when satisfied, indicate an event is occurring within the scene. A bounding box is also generated from the image and is structured to encompass a detected 3D object. A point within the bounding box is then selected. This selected point is projected from a 2D-space image plane of the image into 3D space to generate a 3D-space point. Based on the 3D-space point, the embodiments generate a 3D-space ground contact point that contacts a 3D-space ground plane in the 3D space. That 3D-space ground contact point is then reprojected onto the ground plane of the image to generate a synthesized 2D ground contact point in the image. The embodiments then determine that a location of the synthesized 2D ground contact point in the ground plane of the image satisfies the conditions. As a consequence, the event is determined to be occurring in the scene.

In some embodiments, a buffer zone is generated around the 3D-space ground contact point in the 3D space. Then, the embodiments reproject one or more portions of the buffer zone onto the ground plane of the image. The embodiments also determine that a threshold amount of the reprojected portions of the buffer zone in the ground plane of the image satisfies the conditions. As a consequence, the event is determined to be occurring in the scene based on the buffer zone.

Some embodiments monitor a calibration of a camera and perform a recovery calibration of the camera when the camera's calibration fails to satisfy a calibration threshold score. For instance, the embodiments can perform an initial calibration on a camera and then progressively collect images generated by the camera. Notably, these images depict humans. For each image that is progressively collected, the embodiments (i) generate a bounding box around each image's human, (ii) identify a footprint of each image's human, (iii) identify a headpoint of each image's human, and (iv) retain the bounding box, the footprint, and the headpoint as a corresponding low data image that corresponds to each image. The embodiments select a first bounding box of a selected low data image, including that first bounding box's associated first footprint and first headprint. A central point is then selected from within the first bounding box. That central point is projected from a 2D-space image plane into 3D space to generate a 3D-space central point. Based on the 3D-space central point, the embodiments generate (in 3D space) at least a 3D-space footprint representative of a human foot and a 3D-space headpoint representative of a human head. The 3D-space footprint and 3D-space headpoint are reprojected into the 2D-space image plane of the low data image (and perhaps other data points are also reprojected) to generate a synthesized 2D footprint and a synthesized 2D headpoint in the low data image. A synthesized bounding box is generated around the synthesized 2D footprint and the synthesized 2D headpoint in the low data image. A fitting score is also generated based on comparisons between (i) the 2D footprint and the first footprint, (ii) the 2D headpoint and the first headpoint, and (iii) the synthesized bounding box and the first bounding box. Based on the fitting score, the embodiments either refrain from triggering a recalibration of the camera or, alternatively, trigger the recalibration of the camera.

Some embodiments infer the occurrence of an event based on one or more conditions detected within in a 3D space, where the one or more conditions are identified based on 2D image data. For example, some embodiments identify, from a 2D rule imposed against a ground plane represented within an image, one or more conditions that reflect an occurrence of an event. A bounding box is then generated from the image, where the bounding box encompasses a 3D object detected from within the image. A point is selected within the bounding box and a 3D-space point is generated by projecting the selected point from a 2D-space image plane of the image into 3D space. Based on the 3D-space point, the embodiments generate a 3D-space ground contact point that contacts a 3D-space ground plane in the 3D space. The 3D-space ground contact point is reprojected onto the ground plane of the image to generate a synthesized 2D ground contact point in the image. The occurrence of the event is then inferred by determining that a location of the synthesized 2D ground contact point in the ground plane of the image satisfies the one or more conditions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 1A and 1B illustrate different environments, or rather scenes within environments, and cameras that may be used by the disclosed embodiments.

FIG. 26 illustrates an example computer system configured to perform any of the disclosed operations.

DETAILED DESCRIPTION

Figure 1B:
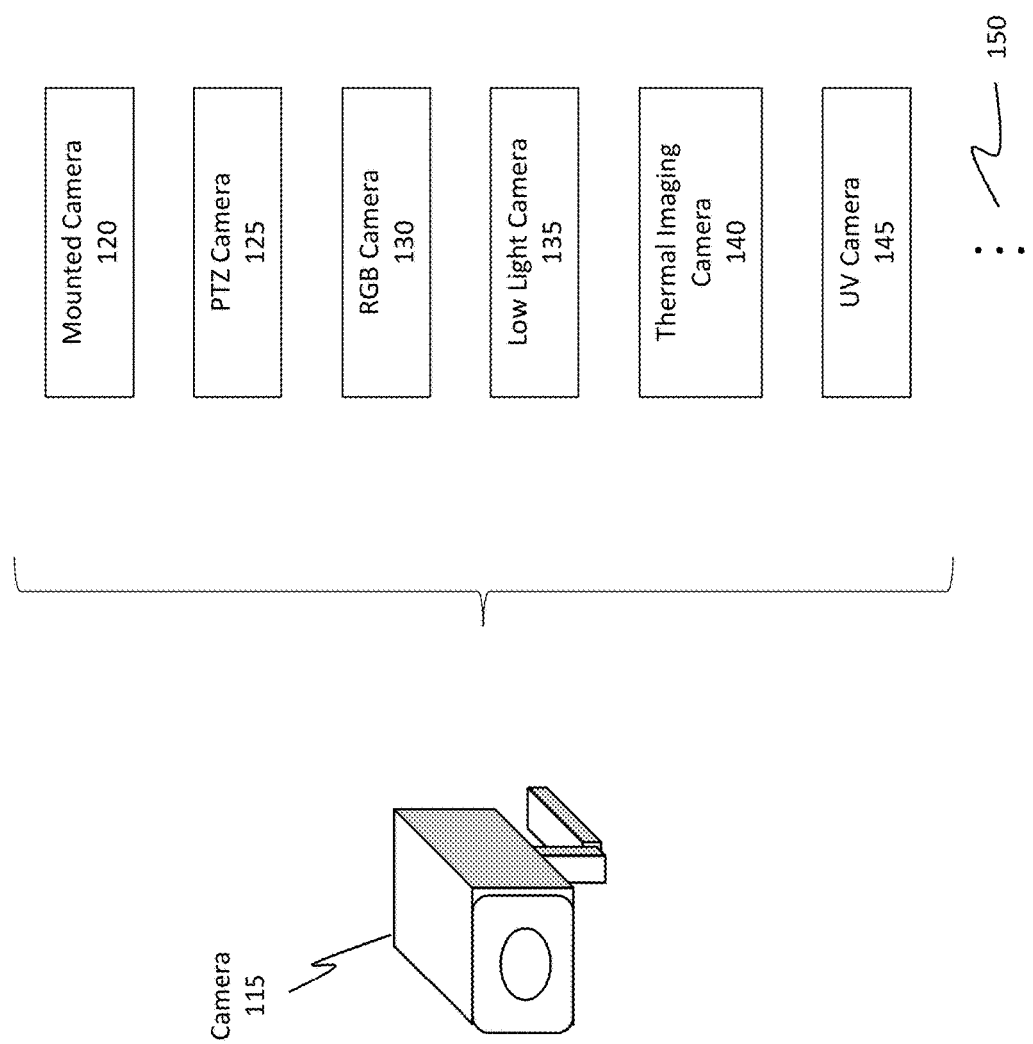

The disclosed embodiments relate to systems, devices, and methods that to infer whether an event is occurring in 3D space based on 2D image data and that maintain a camera's calibration.

In some embodiments, an image of a scene is accessed. Input is received, where the input defines or includes a 2D rule imposed against a ground plane. The 2D rule defines or includes conditions indicative of an event occurring in the scene. A bounding box is generated and encompasses a detected object. A point within the bounding box is projected from a 2D-space image plane of the image into 3D space to generate a 3D-space point. Based on the 3D-space point, a 3D-space ground contact point is generated. That 3D-space ground contact point is reprojected onto the ground plane of the image to generate a synthesized 2D ground contact point. A location of the synthesized 2D ground contact point is determined to satisfy the conditions defined by the 2D rule. As a consequence, the event is happening.

In some embodiments, a buffer zone is generated around the 3D-space ground contact point in the 3D space. The buffer zone is reprojected back onto the ground plane of the image. The embodiments determine that a threshold amount of the reprojected buffer zone in the ground plane satisfies the conditions defined by the 2D rule. As a consequence, the event is determined to be occurring.

Some embodiments infer the occurrence of an event based on conditions detected within a 3D space, where the conditions are identified based on 2D image data. Specifically, a 2D rule includes conditions that reflect an occurrence of an event. A bounding box is generated from an image and encompasses a 3D object. A point is selected within the bounding box, and a corresponding 3D-space point is generated in 3D space. Based on the 3D-space point, the embodiments generate a 3D-space ground contact point that contacts a 3D-space ground plane. The 3D-space ground contact point is reprojected to generate a synthesized 2D ground contact point in the image. The occurrence of the event is inferred by determining that a location of the synthesized 2D ground contact point satisfies the conditions.

Some embodiments recover a camera's calibration. For example, the embodiments perform an initial calibration on the camera and then progressively collect images. These images depict humans. For each image, the embodiments (i) generate a bounding box around the human, (ii) identify a footprint of the human, (iii) identify a headpoint of the human, and (iv) retain these pieces of data in a low data image. The embodiments select a first low data image as well as that image's bounding box, footprint, and headprint (the term "first" is used in this paragraph for reference clarification). A central point is selected from within the first bounding box. That central point is projected into 3D space to generate a 3D-space central point. Based on the 3D-space central point, the embodiments generate (in 3D space) a 3D-space footprint and a 3D-space headpoint. These pieces of data are reprojected into the 2D-space image plane to generate a synthesized 2D footprint and a synthesized 2D headpoint in the low data image. A synthesized bounding box is generated around the synthesized 2D footprint and headpoint in the low data image. A fitting score is generated based on certain comparisons. Based on the fitting score, the embodiments either refrain from triggering a recalibration of the camera or, alternatively, trigger the recalibration of the camera.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous substantial improvements to the technical field. For instance, because the embodiments proactively monitor a camera and enable that camera to self-correct its calibration (i.e. an automatic and autonomous operation), the embodiments ensure that the camera is reliably providing accurate data. In this sense, the practice of the disclosed principles results in substantially improved data quality and accurateness by ensuring the camera operates in a high quality calibration state.

The embodiments also improve the technical field by improving how events are detected within environments and in particular within scenes of environments. As used herein, a "scene" refers to an observable area that is observed by a camera located within an environment. In this regard, an environment may include any number of different scenes, where the determination of what constitutes a "scene" is dependent on what portion of the environment is observable by the camera. That is, even though a single camera system is being used, the embodiments are nevertheless able to accurately identify when three-dimensional activities or events are occurring within the scene(s) of the environment. This recognition or identification is performed in a highly accurate manner such that the embodiments are able to provide pinpoint location recognition and perform focused inferences. These and other benefits will be discussed in detail throughout this disclosure.

Single Camera Systems

Attention will now be directed to FIG. 1A, which illustrates an example environment 100 in which a camera 105 is positioned. Here, the gravity vector 110 illustrates the direction of gravity relative to the camera 105. The plane that is perpendicular to the gravity vector 110 is referred to herein as a "ground plane." Camera 105 is shown as monitoring the environment 100. One will appreciate how environment 100 may be any type of environment, without limit. Examples include, but are not limited to, any type of retail, banking, office, indoor, or outdoor environment. Additionally, camera 105 may be any type of monitoring camera. FIG. 1B illustrates some different camera implementations.

Specifically, FIG. 1B shows a camera 115, which is representative of the camera 105 of FIG. 1A. Camera 115 can be embodied in different ways. For instance, camera 115 can be a mounted camera 120 (i.e. a camera mounted to a fixed position in an environment), or a pan, tilt, zoom PTZ camera 125. Camera 115 can also be a red, green, blue RGB camera 130, a low light camera 135, a thermal imaging camera 140, or an ultraviolet UV camera 145. The ellipsis 150 represents other form factors of the camera 115. In some cases, the camera 115 is a combination of these camera types (e.g., a PTZ camera that is also a RGB camera, or a low light camera, or a thermal imaging camera, or a UV camera). In some cases, the camera 115 is an oscillating camera that may stop at any number of stop positions in order to generate an image. In some cases, the camera's shutter may be sufficiently fast such that the camera 115 can oscillate without stopping and an image may be generated. Different calibration parameters may be provided for each image capture position or stop position, and those calibration parameters may be used when mapping 2D content into the 3D space.

With that background, attention will now be directed to the subsequent figures. This disclosure will first describe a method for calibrating a camera and for ensuring that the calibration remains accurate throughout a time period. Following that discussion, the disclosure will describe techniques for inferring events within an environment (or rather, within an environment that includes scenes) through the use of a calibrated camera and through the use of a so-called "2D rule" that is drawn relative to the ground plane. Optionally, these inferences may be made through the use of a buffer zone. These topics, among others, will now be discussed in detail.

Methods for Maintaining a Camera in a Calibrated State

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Attention will now be directed to FIGS. 2A, 2B, 2C, and 2D, which illustrate a flowchart of an example method 200 for monitoring a calibration of a camera and for performing a recovery calibration of the camera when the camera's calibration fails to satisfy a calibration threshold score. The method 200 may be performed using the camera 115 of FIG. 1B.

Figure 2A:
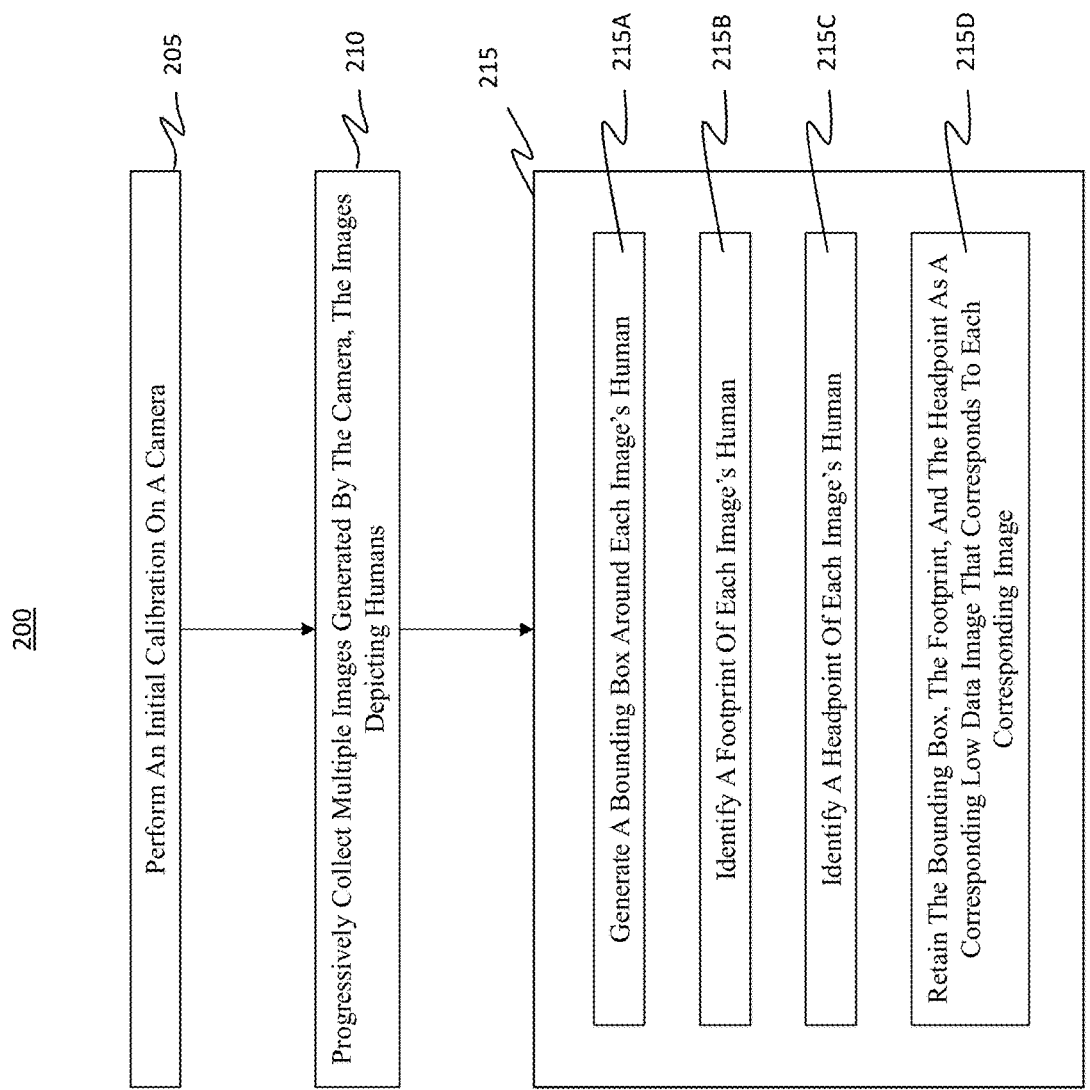
FIGS. 2A, 2B, 2C, and 2D illustrate a flowchart of an example method for inferring whether a certain event is occurring in a scene of an environment.
Figure 3:
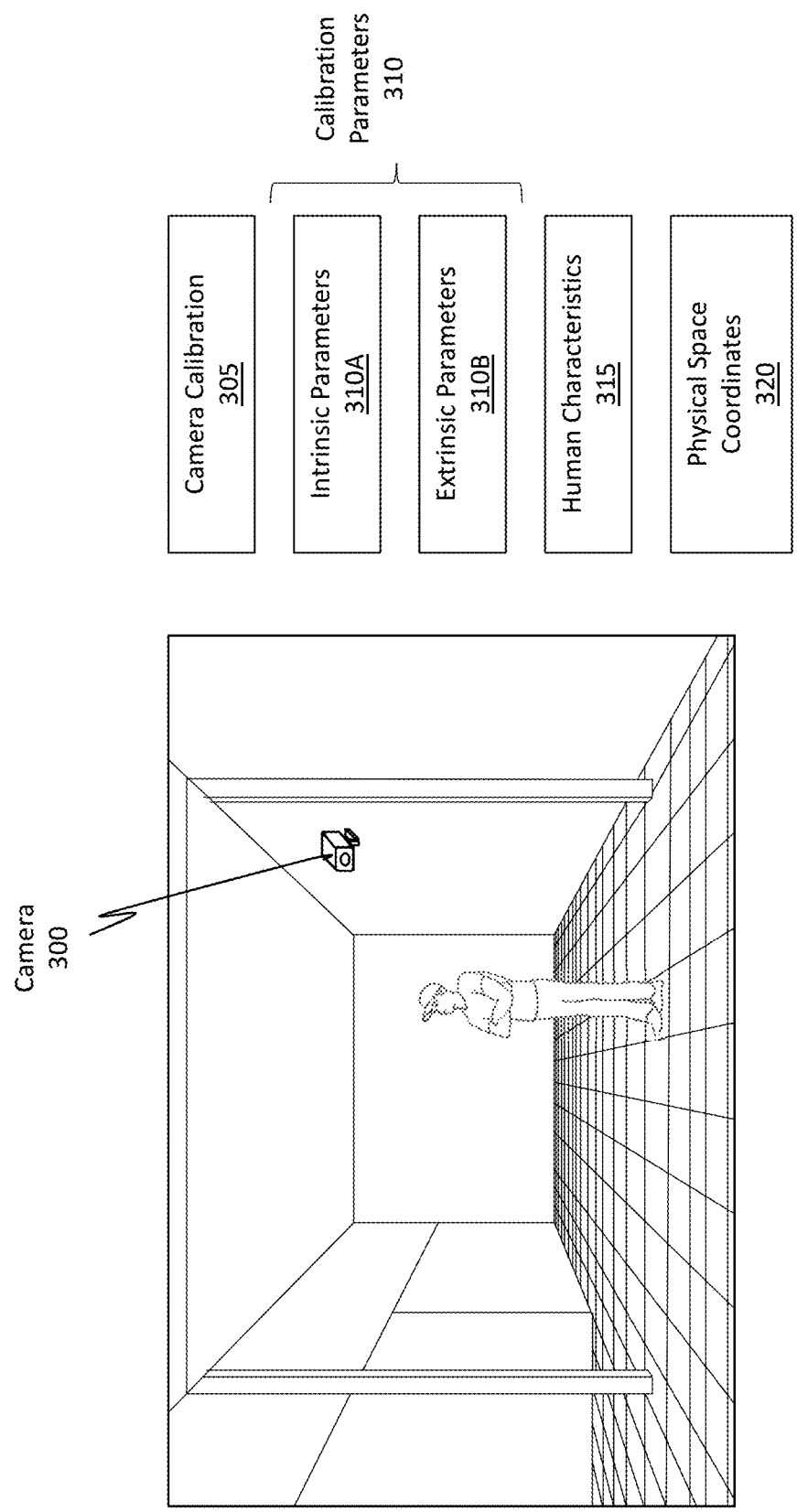
FIG. 3 illustrates an example technique for estimating calibration parameters (e.g., intrinsic and extrinsic calibration parameters) for a single camera.

Method 200 in FIG. 2A initially includes an act (act 205) of performing an initial calibration on a camera. For instance, turning briefly to FIG. 3, camera 300 may be the camera that is undergoing an initial camera calibration 305. During the camera calibration 305 process, certain calibration parameters 310, including intrinsic parameters 310A and extrinsic parameters 310B, are determined. As described earlier, the intrinsic parameters 310A generally relate to the operability of the camera 300 itself (e.g., the internal geometry and optical attributes of the camera 300), and the extrinsic parameters 310B generally relate to the physical location and orientation of the camera 300 with respect to the environment, or the world coordinates of the 3D space in which the camera 300 is positioned.

Traditional camera calibration processes often required the camera to capture an image of an object with known characteristics (e.g., a checkboard). The camera would then compare the distortions detected in the image against the known characteristics of the object in order to estimate the intrinsic parameters 310A and extrinsic parameters 310B.

In addition to that ability, the disclosed embodiments are also able to use human characteristics 315 to perform the camera calibration 305. That is, when a human is detected in an image, the embodiments are able to detect the gender of the human and then impute average characteristics for that human (e.g., the average height for a male adult or the average height for a female adult and the average shoulder width for a male adult or the average shoulder width for a female adult, etc.). By imputing these average human characteristics 315 onto the detected human, the camera system has now identified a "known" object with which to base its calibration on. Accordingly, instead of a checkboard-like object or some other manually introduced object, the embodiments are able to dynamically use objects (e.g., humans) that appear in the environment to perform their calibration processes. As a consequence, the disclosed camera systems are able to automatically perform a calibration process without the need for controlled human involvement (e.g., random humans appearing in the environment can be used for the calibration). By performing the camera calibration 305, the embodiments are able to determine the physical space coordinates 320 of the camera 300 relative to its environment. The physical space coordinates 320 allow the system to determine the camera's height and angle of direction relative to the environment.

Figure 4:
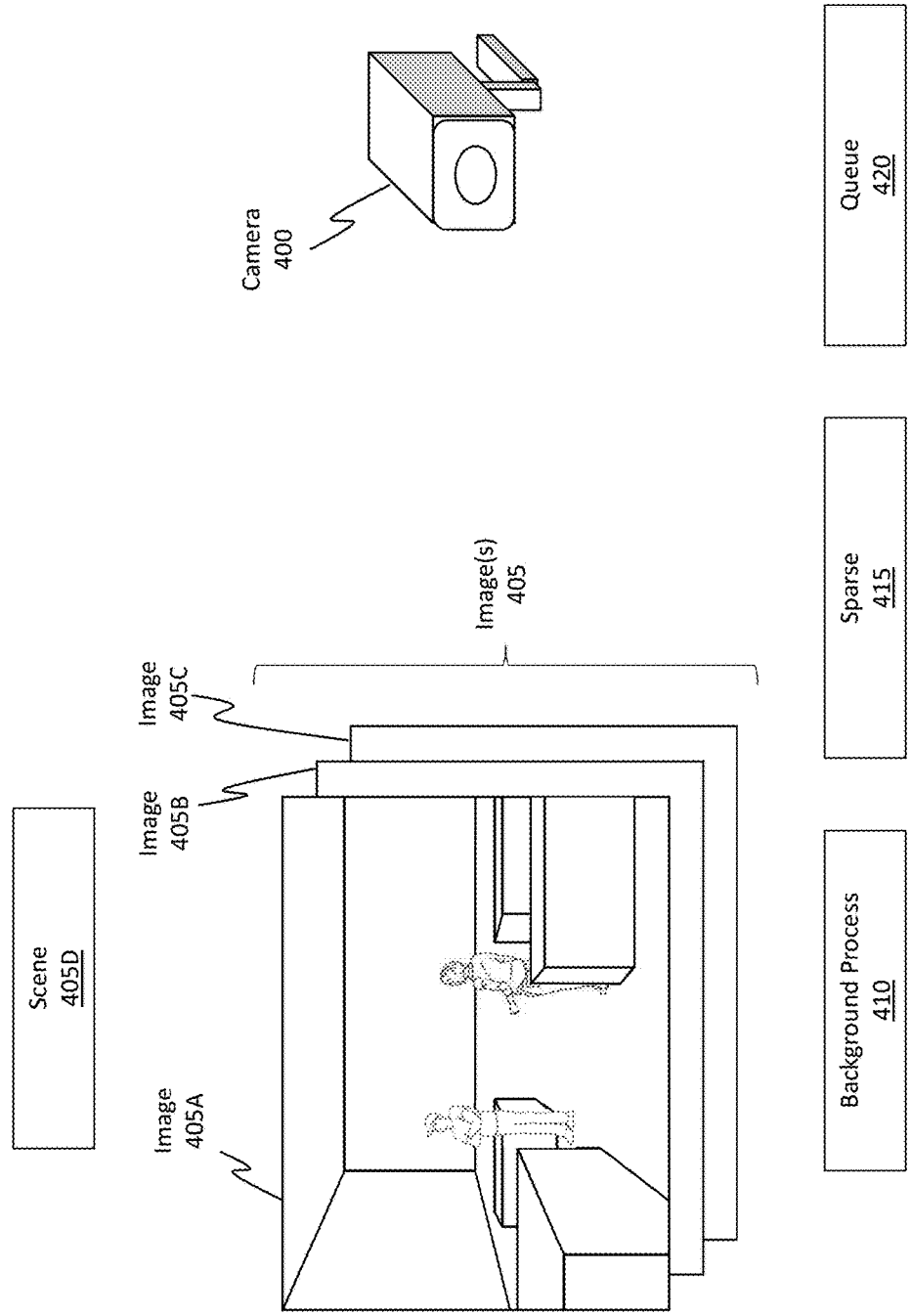
FIG. 4 illustrates how a camera can capture multiple images as a background process and in a sparse manner.

Returning to FIG. 2A, method 200 also includes an act (act 210) of progressively collecting multiple images (e.g., a plurality of images) generated by the camera. These images depict humans. If the camera captures an image that does not have a human in it, then that image can be filtered out and discarded. In this regard, the embodiments can optionally perform an object recognition operation to ensure a human is present in the image and can also optionally perform a filtering operation on the images to discard images not having humans. FIG. 4 is representative of the operations described in method act 210.

Specifically, FIG. 4 shows a camera 400, which is representative of the camera mentioned in method 200. Camera 400 is configured to generate multiple image(s) 405, such as image 405A, image 405B, and image 405C. As discussed earlier, the camera 400 is located within an environment. The observable areas of the environment by the camera 400 constitute a "scene." Consequently, the image(s) 405 reflect the observable portion(s) of the environment by the camera 400 and, therefore, the image(s) 405 are of a scene 405D. As a further note, the environment may include any number of "scenes" depending on the number of cameras and depending on whether a camera is stationary (and, therefore, capturing image content for a single scene) or is moveable (thereby capturing image content for multiple scenes). Notably, the generation of these image(s) 405 is performed as a background process 410 for the camera 400 and is also performed in a sparse 415 manner. By "background process," it is generally meant that the generation of these images is performed "behind the scenes" as a low priority operation and is performed without user intervention. To clarify, if a high priority operation is being performed, the camera 400 can delay the generation of an image for a period of time to allow the high priority operation to proceed.

The sparse 415 manner generally means that the generation of images is performed intermittently and in a periodic manner. For instance, when operating in a sparse 415 manner to generate the image(s) 405, the camera 400 may generate images only every 1 minute, 2 minutes, 3 minutes, 4 minutes, 5 minutes, 6 minutes, 7 minutes, 8 minutes, 9 minutes, 10 minutes, 15 minutes, or even 20 minutes. Longer durations or shorter durations may also be used.

Each time the camera 400 is triggered to generate images as the background process 410 and in the sparse 415 manner, the camera 400 generates a predetermined number of images. For instance, during each image generation event, the camera 400 may generate 1, 2, 3, 4, 5, 6, 7, 8, 9, 10, 11, 12, 13, 14, 15, or 20 images. Of course, more or less images may be generated. In some cases, the images are generated rapidly, one after the other (e.g., less than 0.5 seconds in between captures), while in other cases, a delay time period is imposed between each time an image is generated (e.g., more than 0.5 seconds, 1.0, 1.5, 2.0, 2.5, 3.0 seconds, etc. time delays). Optionally, an image quality check may be performed on each image to ensure that the quality of the images satisfies a quality threshold (e.g., to prevent the collection of blurry images). For example, it may be the case that an object in the image is moving too quickly and results in the generation of a blurred image. If an image's quality fails to satisfy the quality threshold, that image may be discarded and a new image may be generated in its place.

As images are progressively collected over time, the image(s) 405 are loaded into a queue 420. Queue 420 may be a first in first out (FIFO) queue having a predetermined size, such as perhaps a size of 1,000. Of course, other sizes may also be used (e.g., 100, 200, 300, 400, 500, 600, 700, 800, 900, 1,100, 1,200, 1,300, 1,400, 1,500 and so on). Images are progressively loaded into the queue 420 until the queue is full. Once full, then the oldest images are ejected from the queue 420 and the newest images are injected into the queue 420 in a first in first out ordering scheme. The time taken to fill the queue 420 depends on the number of images that are generated for each image generation event as well as the time between each image generation event. In other words, the timing depends on the sparse 415 attributes as well as the number of images generated at each event.

By way of example, suppose the camera 400 is triggered to sparsely generate images every 5 minutes. For each triggering event, the camera 400 (in this example) is also triggered to generate 10 images. With these parameters, there will be 12 image generation events per hour, resulting in 120 images generated per hour. Therefore, it will take 8 hours and 20 minutes to fill a queue having a size of 1,000.

Each image is analyzed to determine whether it includes content representative of a human. In these scenarios, humans are being used as the calibration target to perform the calibration check. Therefore, an object segmentation process is performed on each of the generated images to ensure it includes a human. If the image does not include a human, then it is discarded. If no humans are detected in the scene for a prolonged period of time, then the time required to fill the queue 420 may be prolonged. If the delay exceeds a predetermined delay threshold, then an alert can be sent to an administrator to notify the administrator that a sufficient number of baseline images have not been collected in order to perform a calibration quality check. The alert may cause the administrator to send a person into the scene so an image with a human can be generated.

Figure 5:
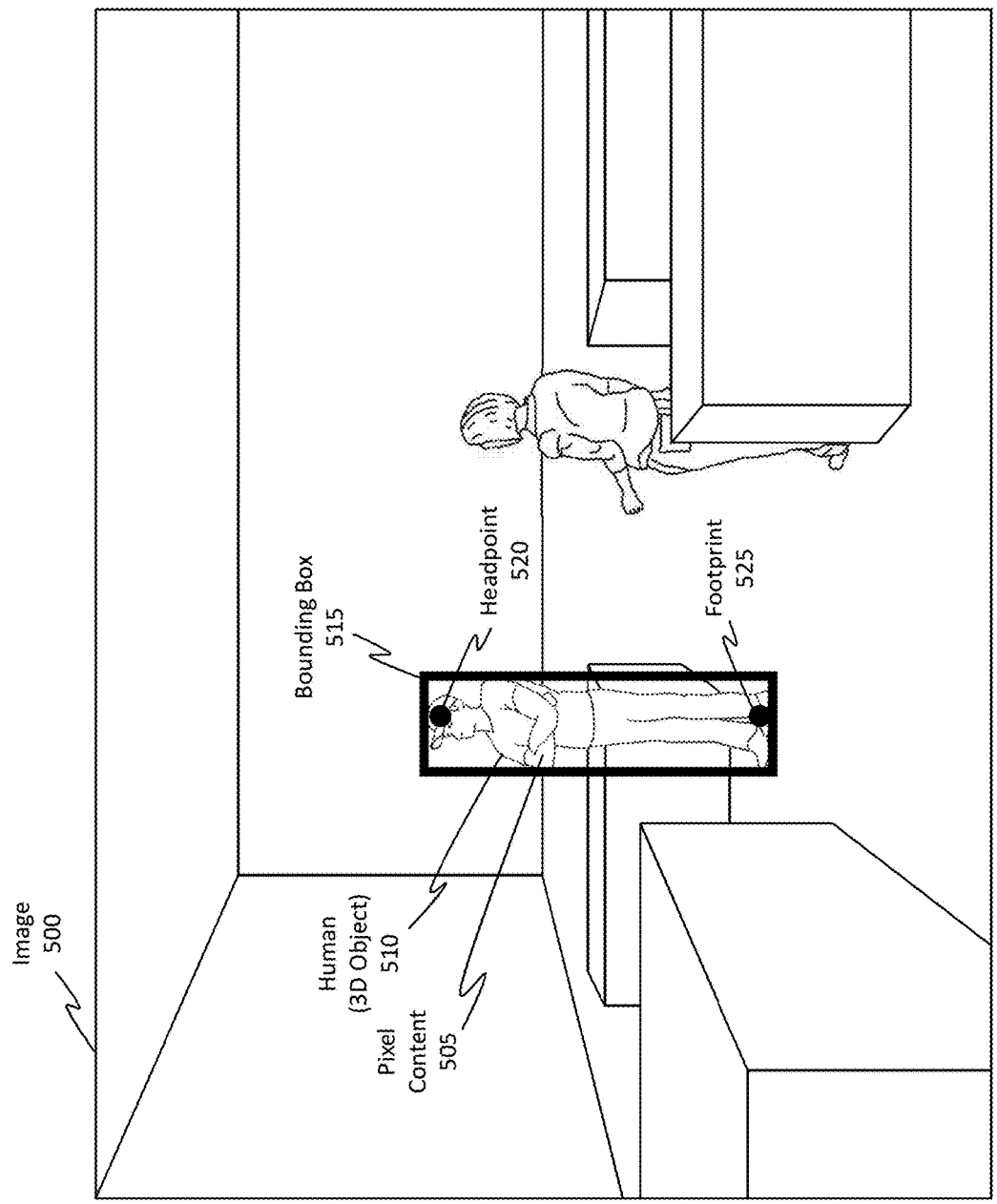
FIG. 5 illustrates how a bounding box, a headpoint, and a footprint can be generated on an image.
Figure 6:
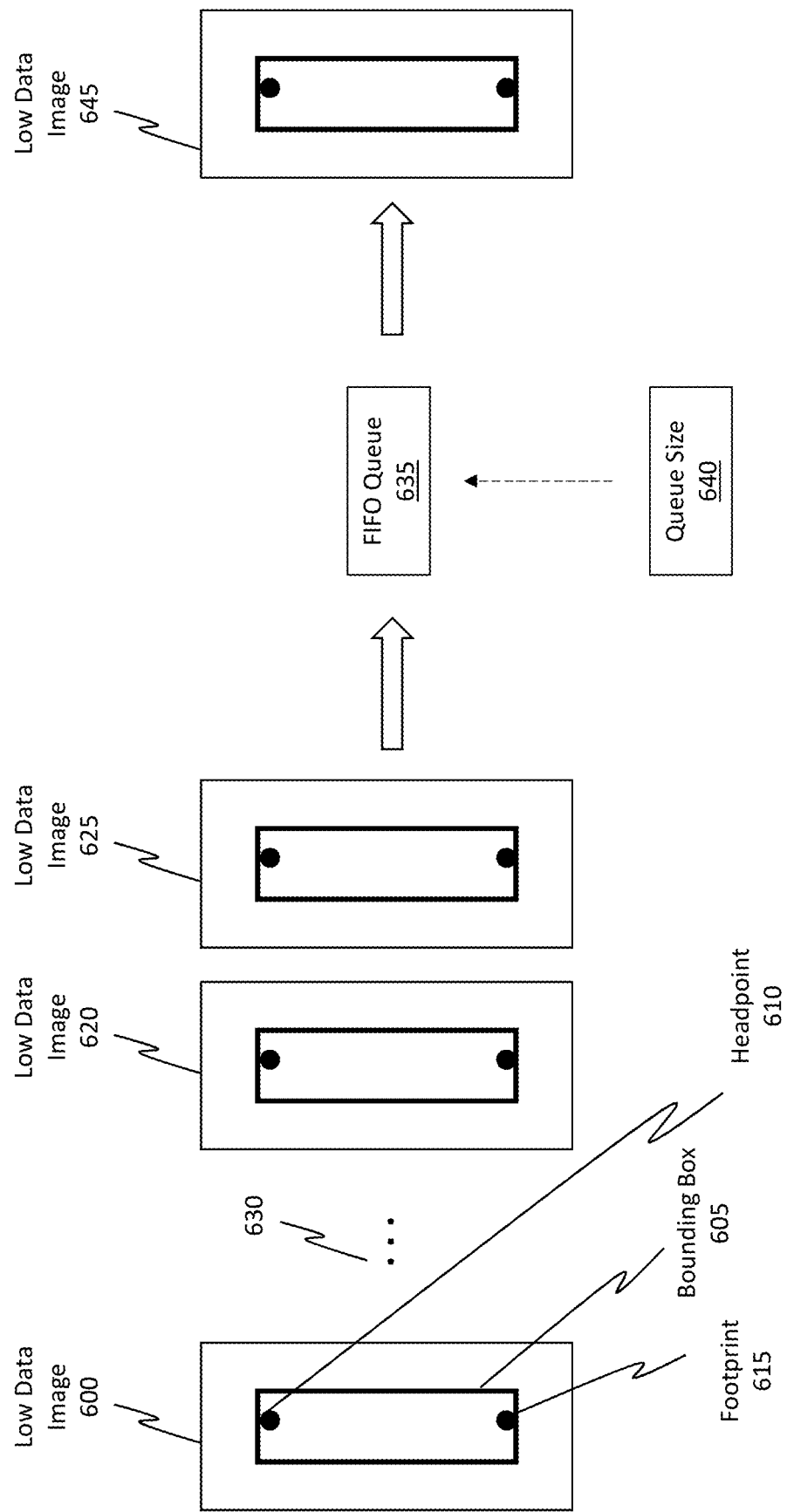
FIG. 6 illustrates how a low data image may be generated based on the bounding box, the headpoint, and the footprint, and how the low data image can be retained.

Returning to FIG. 2A, method 200 also includes a number of acts that are performed for each image that is progressively collected. The collection of these sub-acts is included in act 215. In particular, for each one of the collected or generated images, method 200 includes an act 215A of generating a bounding box around each image's detected human; an act 215B of identifying a footprint of each image's detected human; an act 215C of identifying a headpoint of each image's detected human; and an act 215D of retaining the bounding box, the footprint, and the headpoint as a corresponding low data image that corresponds to each image. FIGS. 5 and 6 are representative of these acts.

FIG. 5 shows an image 500, which may be one of the image(s) 405 of FIG. 4. Image 500 includes different pixels that represent different content, as shown by pixel content 505. The embodiments are able to perform object segmentation on the image 500 to detect objects included in that image 500. For example, by analyzing the pixel content 505, the embodiments are able to determine a human 510 (e.g., an example of a 3D object) is represented within the image 500. In this case, there are actually multiple humans in the image 500.

In response to identifying a human 510 in the image 500, the embodiments are able to generate a bounding box 515 around the image pixels that represent the human 510. If the image 500 includes multiple humans, then multiple bounding boxes may be generated.

With the bounding box 515 in place, the embodiments then are able to perform a head identification analysis to identify a headpoint 520 of the human 510 and a skeleton analysis to identify a footprint 525 of the human 510. The headpoint 520 refers to a point reflective of the head of the human 510. Likewise, the footprint 525 refers to a point reflective of a foot of the human 510. These pieces of data are compiled for each of the images that are generated and collected.

The bounding box 515, headpoint 520, and footprint 525 are then retained in a low data image. That is, a new image can be generated, where the new image includes only those three pieces of data. The original image, which was likely a high resolution and high quality image, can be discarded in an effort to minimize memory usage. Because the low data image includes only a relatively small amount of pixel data (e.g., the bounding box 515, the headpoint 520, and the footprint 525), the resolution of the image is much lower than the original version and thus consumes less memory and will also require substantially less computing in order to analyze the low data image as compared to high data images (e.g., the original image).

FIG. 6 shows a resulting low data image 600 that is formed in accordance with the principles just discussed. Here, the low data image 600 includes only a sparse amount of information comprising pixel data representative of a bounding box 605, a headpoint 610, and a footprint 615. The bounding box 605 is representative of the bounding box 515 of FIG. 5; the headpoint 610 is representative of the headpoint 520; and the footprint 615 is representative of the footprint 525. Notice, the amount of pixel content in the low data image 600 is substantially less than the amount of pixel content in the image 500 of FIG. 5.

As discussed earlier, numerous images are generated and collected over time. Because each of the operations mentioned in method act 215 of FIG. 2A is performed for each of the images, multiple low data images will also be generated, as shown by low data image 620 and low data image 625. The ellipsis 630 represents how low data images are generated over time and potentially in a burst manner (e.g., multiple images may be generated then a sparse time delay occurs and then multiple images are again generated). Progressively, the low data images are loaded or injected into a FIFO queue 635, which has a queue size 640 as discussed earlier. Once the FIFO queue 635 is full, then low data images are ejected in a first in first out manner. For example, the low data image 645 is shown as currently being ejected from the FIFO queue 635 because a new low data image was injected into the FIFO queue 635 and triggered the oldest low data image (i.e. low data image 645) to be ejected. In this fashion, the embodiments are able to retain low data images comprising bounding box data, headpoint data, and footprint data.

Figure 2B:
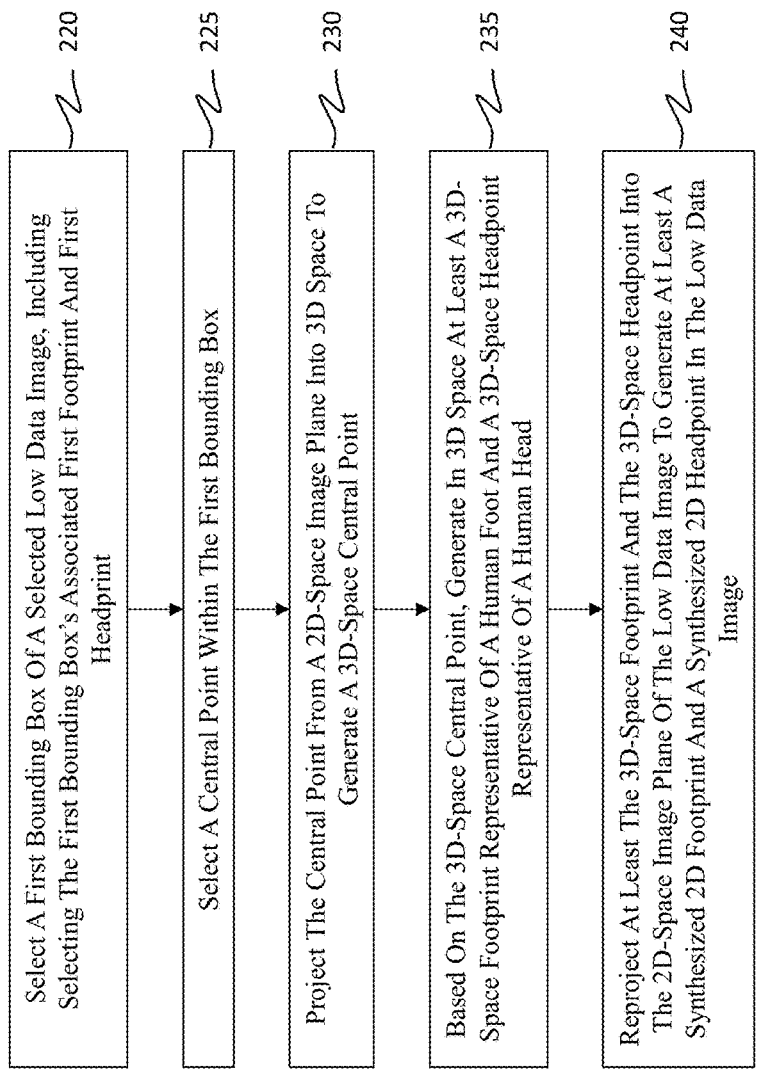
Figure 2C:
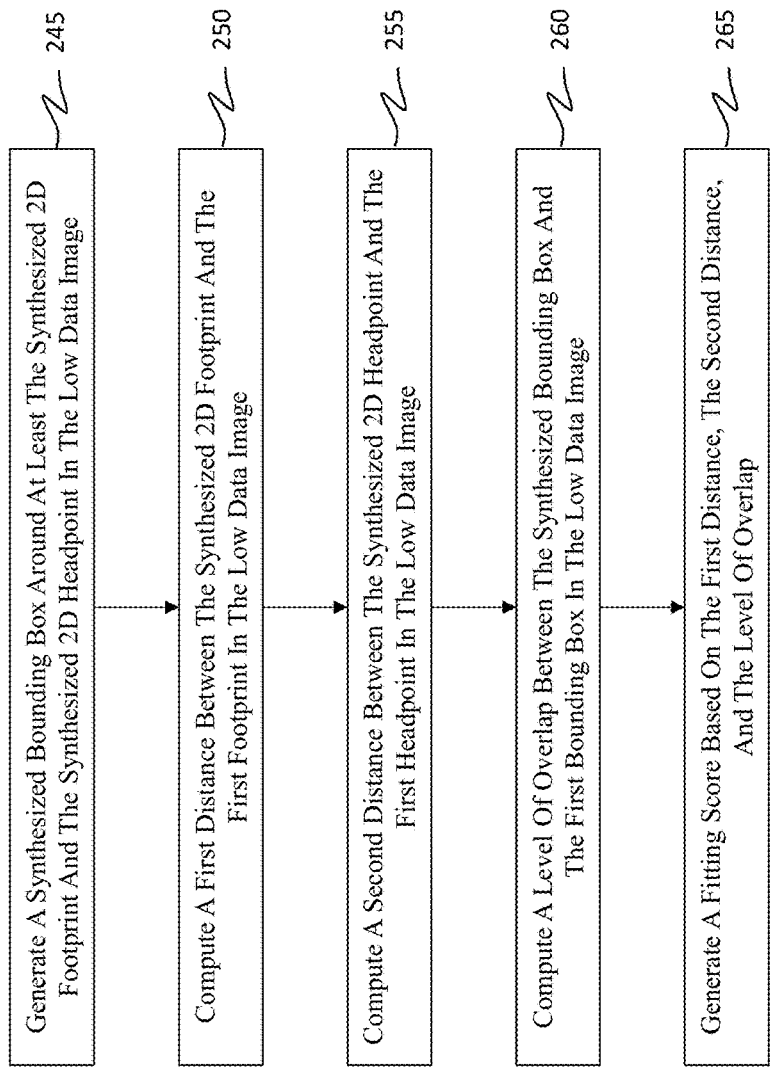
Figure 7:
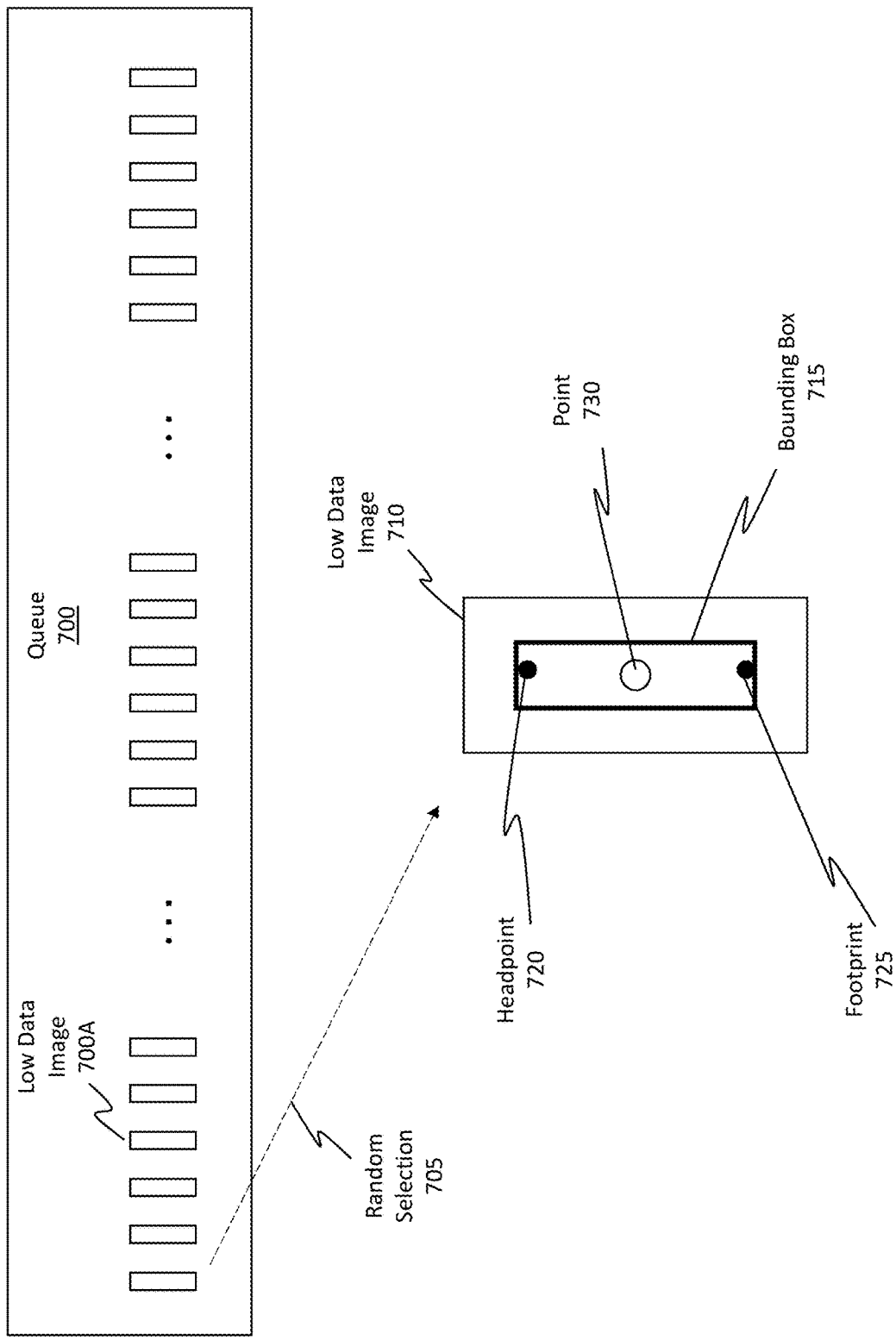
FIG. 7 illustrates how different samples from the queue can be randomly obtained in order to facilitate a calibration check to determine whether the camera's calibration is still valid.

Turning now to FIG. 2B, method 200 includes an act (act 220) of selecting a first bounding box of a selected low data image. This selection process also involves selecting the first bounding box's associated first footprint and first headpoint. Additionally, method 200 includes an act (act 225) of selecting a central point within the first bounding box. FIG. 7 provides further clarification regarding these method acts.

FIG. 7 shows a queue 700, which is representative of the FIFO queue 635 of FIG. 6. Queue 700 is shown as including any number (depending on the queue size) of low data images, such as low data image 700A. Queue 700 effectively operates as a mechanism for maintaining a sampling of images collected over time for the camera. As indicated earlier, it is desirable to periodically "test" or "check" whether or not the camera is still properly calibrated. This test may be performed at any time. Often, it is performed every 24 hours (i.e. the camera's calibration is verified every 24 hours). Other time periods may be used, however. For example, if a high priority application relies on the camera being accurately calibrated, then the calibration test or check may be performed more quickly.

In some embodiments, once a calibration check is performed, then the queue 700 is flushed (perhaps regardless of whether the check indicated the calibration is valid or not valid) and new low data images are progressively loaded into the queue 700. A new calibration check may not occur until the queue 700 is again full. Optionally, a new calibration check may not occur until the queue 700 has filled to a threshold level (e.g., perhaps 50%). Therefore, in these embodiments, the minimum time duration between calibration checks or tests is dependent on the time used to fill up the queue 700 (e.g., to a full level or to the threshold level), which timing is based on the time between each image generation event and the number of images that are generated during each of those events.

Some embodiments refrain from flushing the queue 700 and instead delay a new calibration check from occurring for a computed period of time. This computed period of time may be based on the amount of time required in order to ensure the queue 700 is filled with new low data images that were not in the queue 700 at the time of the last calibration check. Therefore, these embodiments are similar to the ones just described with the exception that a flushing event is not performed.

In order to verify the calibration (i.e. perform the calibration check), the embodiments randomly sample low data images from the queue 700, as illustrated by the random selection 705. A determined number of low data images are selected at random. The number of selected images can be any number, but it is often around about 80 images. For example, 50 images may be randomly sampled, 55 images, 60 images, 65 images, 70 images, 75 images, 80 images, 85 images, 90 images, 95 images, 100 images, or more than 100 images may be randomly sampled when a calibration check is to be performed. Any technique for performing a randomized selection against the low data images included in the queue 700 may be utilized.

In the example shown in FIG. 7, the low data image 710 is one of the multiple images that were randomly selected. Each low data image includes data describing a bounding box, a headpoint, and a footprint. For example, the low data image 710 includes a bounding box 715, a headpoint 720, and a footprint 725. The method act 220 of FIG. 2B involved selecting a particular low data image and then selecting that image's bounding box. In the context of FIG. 7, the low data image 710 was selected, so the bounding box 715 is also selected in accordance with method act 220 of FIG. 2B.

Method act 225 of FIG. 2B then involved selecting a central point of the bounding box. In the context of FIG. 7, the point 730 is representative of the central point of the bounding box 715. The "central point" generally refers to the midpoint of the diagonal ends of the bounding box 715. Notably, it is often (though not always) the case that the point 730 corresponds to a central abdominal point or central mass point of the human for which the bounding box 715 was originally created. That is not always the case, however, such as in situations where a human is positioned near a camera that is tilted so as to capture the human from a highly angled position.

Figure 8:
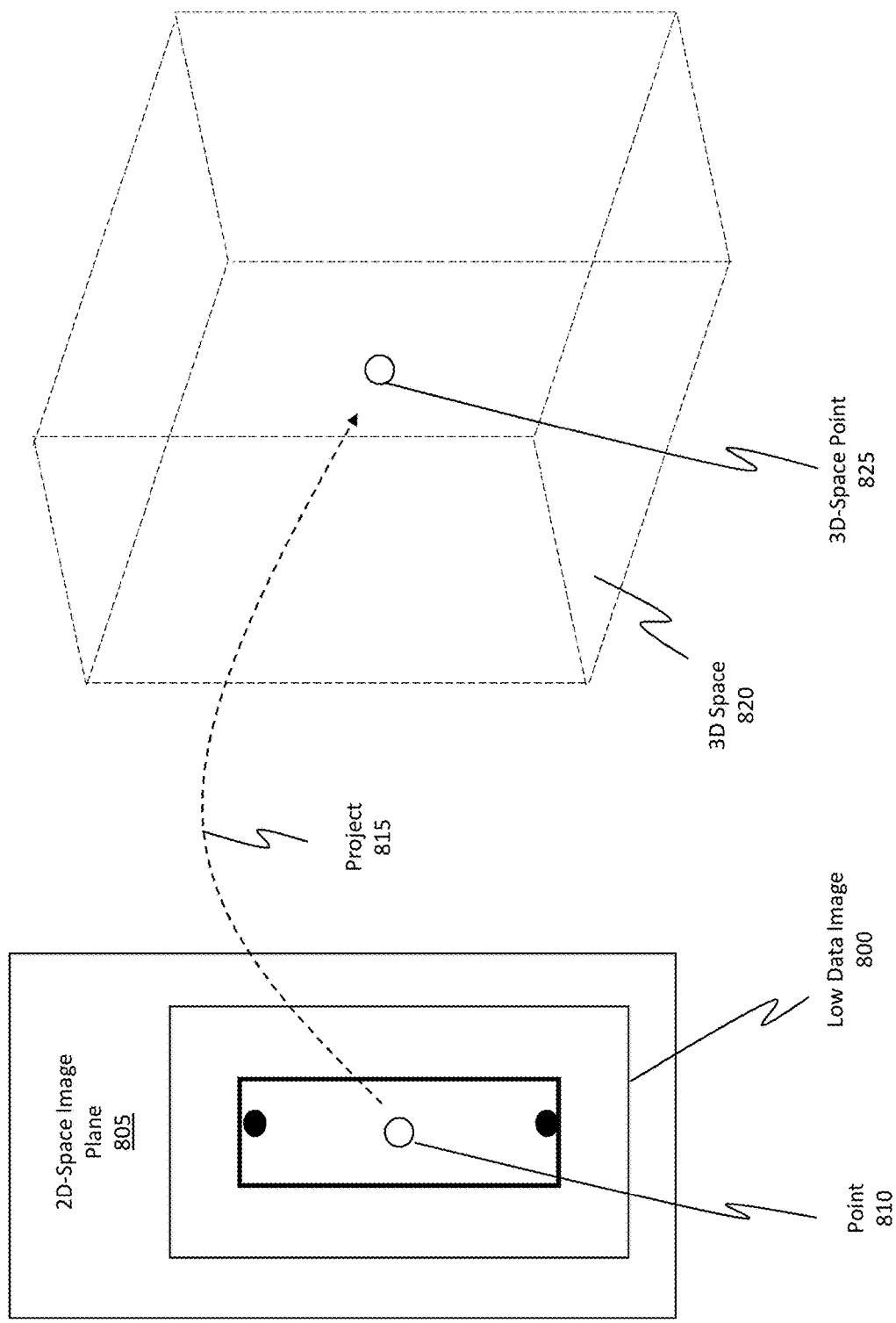
FIG. 8 illustrates an example projection technique in which 2D image data is projected into 3D space.

Returning to FIG. 2B, method 200 then includes an act (act 230) of projecting the central point from a 2D-space image plane into 3D space to generate a 3D-space central point. FIG. 8 provides further clarification regarding this operation.

FIG. 8 illustrates a low data image 800, which is representative of the low data images mentioned thus far. As a generalization, when a camera generates an image, the camera is generating a 2D representation of a 3D world. This 2D representation of the 3D world causes the 3D objects to be represented within a 2D-space image plane 805. The low data image 800 reflects data from the perspective of the 2D-space image plane 805. The point 810 is representative of the central point mentioned earlier. In accordance with the disclosed principles, the embodiments project 815 the point 810 from the 2D-space image plane 805 into 3D space 820 to generate a 3D-space point 825.

As used herein, the term "project" should be interpreted broadly to include any technique for converting 2D data into 3D data. Likewise, the term "reproject" should be interpreted broadly to include any technique for converting 3D data into 2D data. Example techniques for (re)projecting include rasterization (i.e. the process of determining 2D pixel coordinates for 3D objects), ray-tracing, perspective projection, parallel projection, orthographic projection, multi-view projection, axonometric projection, dimetric projection, trimetric projection, oblique projection, and so forth. Reprojection is the inverse operation of a projection.

As used herein, reference to "3D space" does not necessarily mean an entire environment is generated, with an object being placed in that environment. Rather, 3D space should be interpreted broadly to refer to numerous different scenarios, including scenarios involving an expansive 3D environment as well as scenarios in which a single 3D object is generated, irrespective of any surrounding environment. Accordingly, as a result of the projection operation, the 3D-space point 825 is now generated in the 3D space 820.

Figure 9:
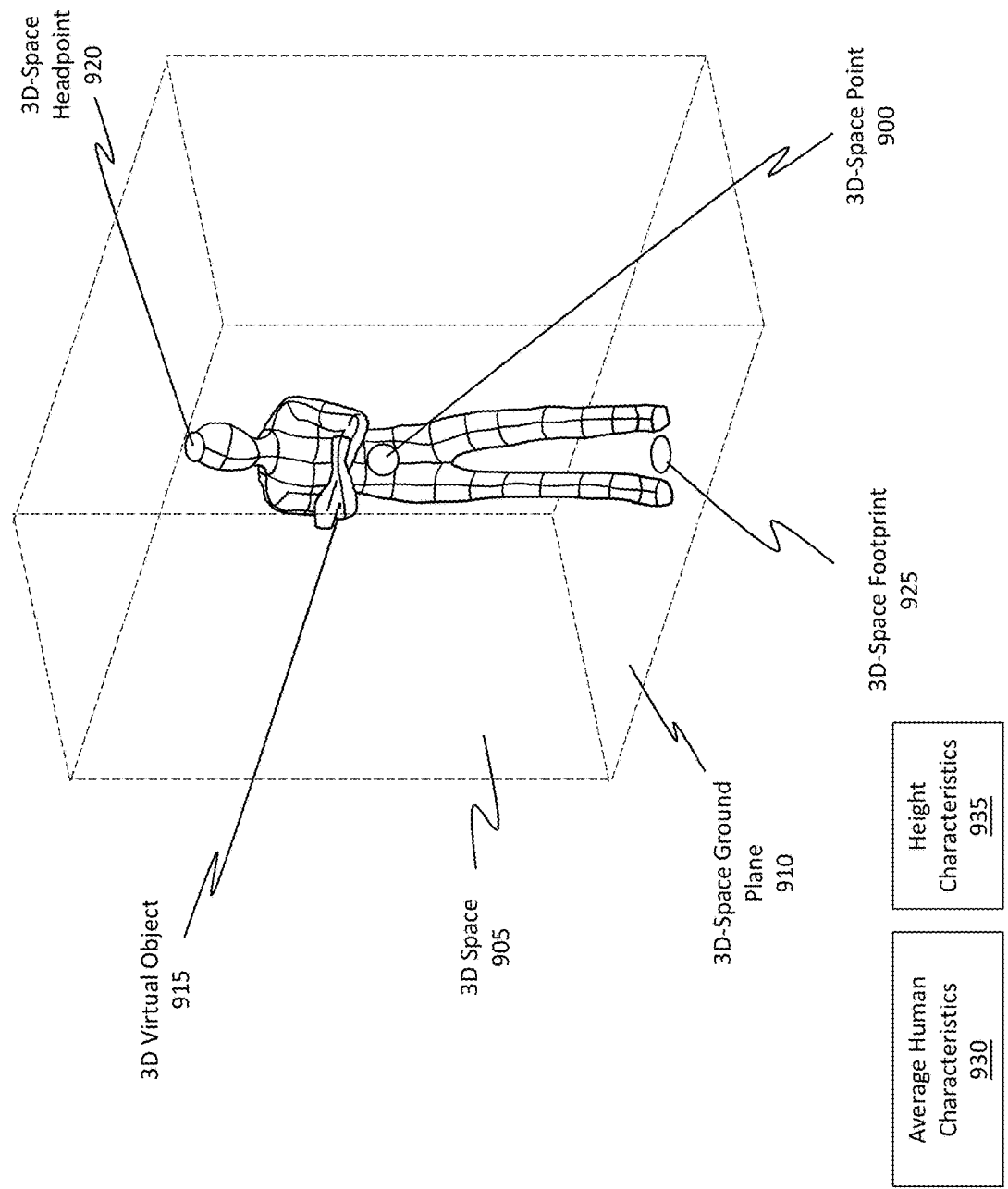
FIG. 9 illustrates how a 3D model can be generated based on the 2D data that was projected into 3D space.

Returning to FIG. 2B, method 200 then involves an act 235 of generating in 3D space (e.g., based on the 3D-space central point) at least a 3D-space footprint representative of a human foot and a 3D-space headpoint representative of a human head. FIG. 9 is representative of this operation FIG. 9 illustrates a 3D-space point 900, which is representative of the 3D-space central point mentioned in method act 235 and which is representative of the 3D-space point 825 of FIG. 8. Notice, the 3D-space point 900 is illustrated as being in 3D space 905, which includes a 3D-space ground plane 910. The 3D-space ground plane 910 is as its name suggests, meaning it is a plane that represents the ground in the 3D space 905.

As mentioned earlier, it is often the case that the 3D-space point 900, which is derived from the central point of the bounding box, is representative of a human's central abdominal area or center of mass. With that baseline understanding, the embodiments use the 3D-space point 900 to generate a model of a human, as shown by the 3D virtual object 915. For example, from the 3D-space point 900 downward, the embodiments generate an abdomen, hips, legs, and feet. From the 3D-space point 900 upward, the embodiments generate the abdomen, chest, arms, neck, and head. As a result of generating this human model (i.e. the 3D virtual object 915), a 3D-space headpoint 920 is generated and a 3D-space footprint 925 is generated. The 3D-space headpoint 920 corresponds to a point on the modeled human's head, and the 3D-space footprint 925 corresponds to a point where the human's feet contact the 3D-space ground plane 910.

To generate the 3D virtual object 915, the embodiments rely on average human characteristics 930, which include average height characteristics 935 of a human. For example, based on the earlier determination as to whether the human bounded by the bounding box was an adult male or female (this information may also be retained with the low data image, such as perhaps in metadata), the embodiments can determine the average height, weight, and body structure of an average adult male or female. Using that information, the embodiments can then generate, model, or estimate legs, a torso, a chest, and a head in accordance with the average human characteristics 930. In some embodiments, the 3D-space footprint 925 may not correspond to the actual location where the modeled feet contact the 3D-space ground plane 910 but rather correspond to the middle position between the modeled human's two feet. For example, in FIG. 9, the 3D-space footprint 925 is actually positioned in between the model's left and right feet. Alternatively, multiple (e.g., two) 3D-space footprints may be generated, one for each foot of the human.

In some embodiments, a highly intricate and complex human model is generated based on the average human characteristics 930. This complex human model may include detailed contours and geometric representations of a human. In some embodiments, only a rudimentary model is generated, where the rudimentary model represents a human using basic shapes, such as a sphere for a head, and cylinders for the torso and legs (or perhaps even only a single cylinder, rectangular prism, or other shape to represent the entirety of the modeled human body).

Figure 10:
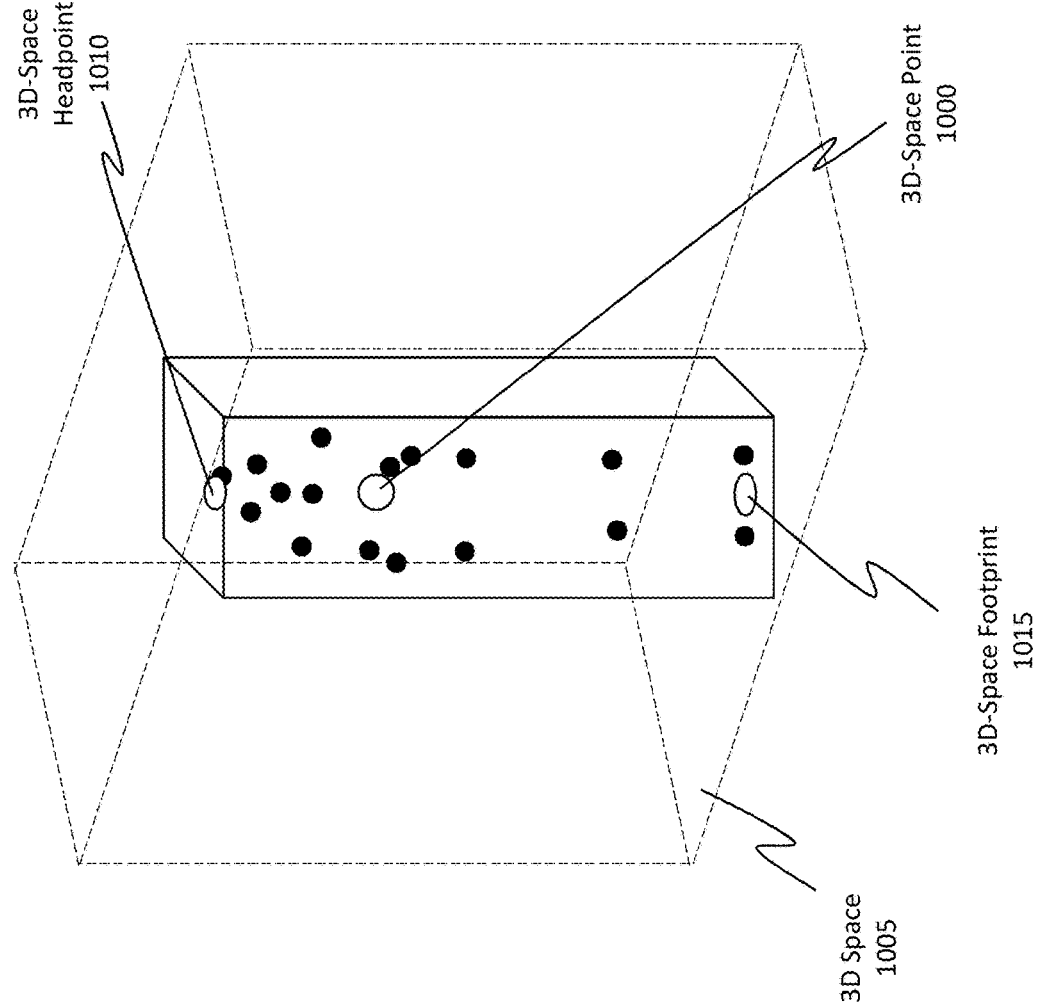
FIG. 10 provides another illustration of how a 3D model can be generated.

FIG. 10 is a simplified companion figure to FIG. 9. Whereas FIG. 9 illustrated the modeled human using geometric lines, the model is represented using dots in FIG. 10. Specifically, FIG. 10 shows the 3D-space point 1000, the 3D space 1005, the 3D-space headpoint 1010, and the 3D-space footprint 1015, all of which are representative of their corresponding features in FIG. 9. Here, however, the modeled human is illustrated using dots instead of lines. One will appreciate how any number of dots may be used for this modeling. A larger number of dots will provide more detail for the modeled human while a smaller number of dots will provide less detail for the modeled human.

Generally, it is beneficial to include a sufficient number of dots to at least provide an outline of the modeled human. For instance, the embodiments may generate a large number of dots to model the outer perimeter or outer contours of the human's shape (i.e. the human's "outline") while using a fewer number of dots (or perhaps even none) to model the inner features of the human model.

Figure 11:
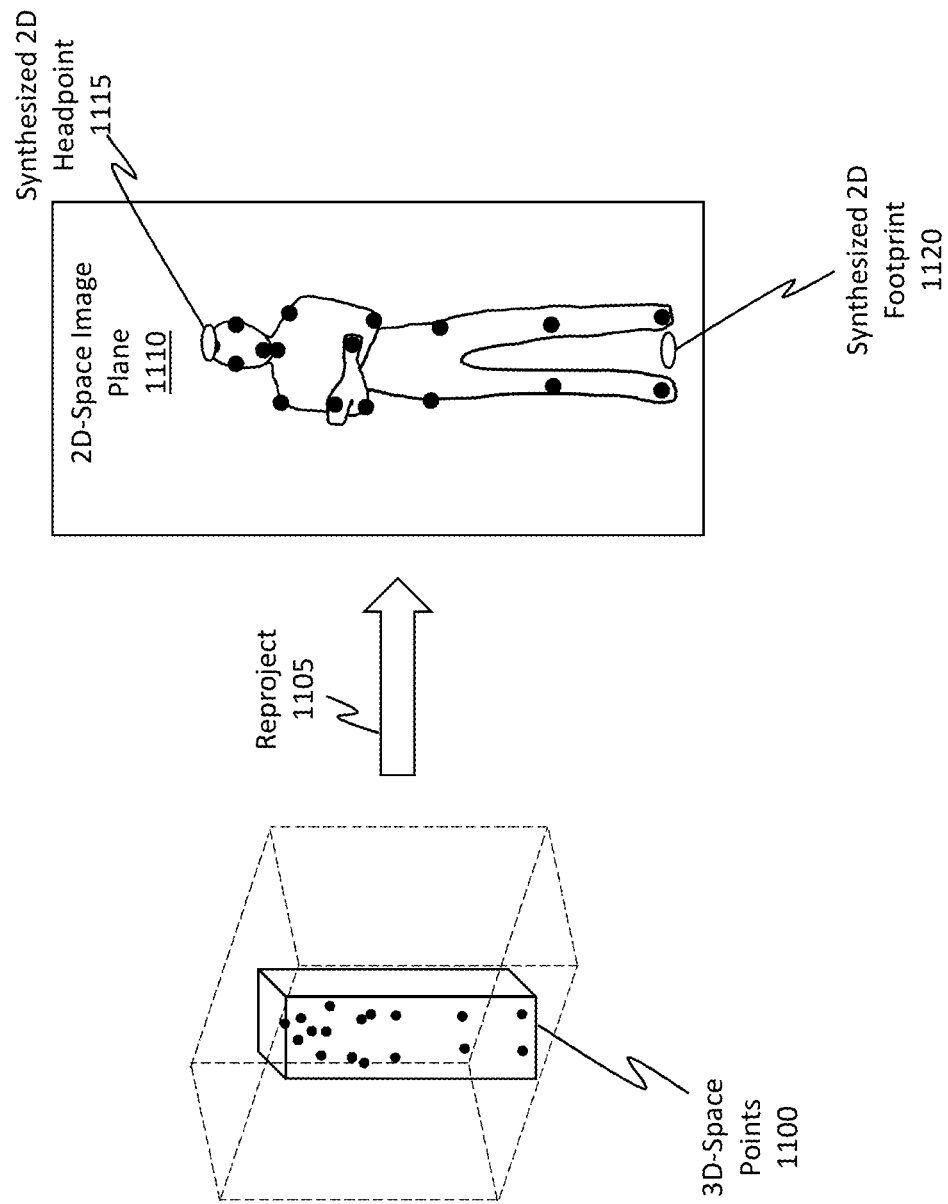
FIG. 11 illustrates how one or more portions of the generated 3D model can be reprojected into 2D space. These portions may include a synthesized headpoint and a synthesized footprint.

Returning to FIG. 2B, method 200 then includes an act (act 240) of reprojecting at least the 3D-space footprint and the 3D-space headpoint into the 2D-space image plane of the low data image to generate at least a synthesized 2D footprint and a synthesized 2D headpoint in the low data image. FIG. 11 is representative of this method act.

FIG. 11 shows how the 3D-space points 1100, which include at least the 3D-space headpoint 1010 and the 3D-space footprint 1015 of FIG. 10 (but may also include points describing the outline of the human model), are reprojected (as shown by reproject 1105) into the 2D-space image plane 1110 of the original low data image. FIG. 11 shows an outline of the human, but not all embodiments include this outline. Some embodiments may reproject only the headpoint and footprint, such that there is no resulting outline in the 2D-space image plane 1110. Also, FIG. 11 has omitted the original bounding box, headpoint, and footprint in the low data image. These features will be shown shortly in FIG. 12.

As a consequence of performing the reproject 1105, at least a synthesized 2D headpoint 1115 and a synthesized 2D footprint 1120 are created. Optionally, if the 3D-space points 1100 include points reflective of the human model's outline, then those points will also be reprojected and a 2D outline will also be created.

Returning to FIG. 2B, method 200 then includes an act (act 245) of generating a synthesized bounding box around at least the synthesized 2D footprint and the synthesized 2D headpoint in the low data image. If a synthesized outline was previously generated, then the bounding box may encompass the synthesized outline as well.

Method 200 also includes a number of acts to generate a so-called "fitting score" based on comparisons between (i) the synthesized 2D footprint and the first (i.e. original) footprint, (ii) the synthesized 2D headprint and the first (i.e. original) headpoint, and (iii) the synthesized bounding box and the first (i.e. original) bounding box. Specifically, act 250 includes computing a first distance between the synthesized 2D footprint and the first footprint in the low data image. Act 255 includes computing a second distance between the synthesized 2D headpoint and the first headpoint in the low data image. Act 260 includes computing a level of overlap between the synthesized bounding box and the first bounding box in the low data image. Act 265 then includes generating a fitting score based on the first distance, the second distance, and the level of overlap.

Figure 12:
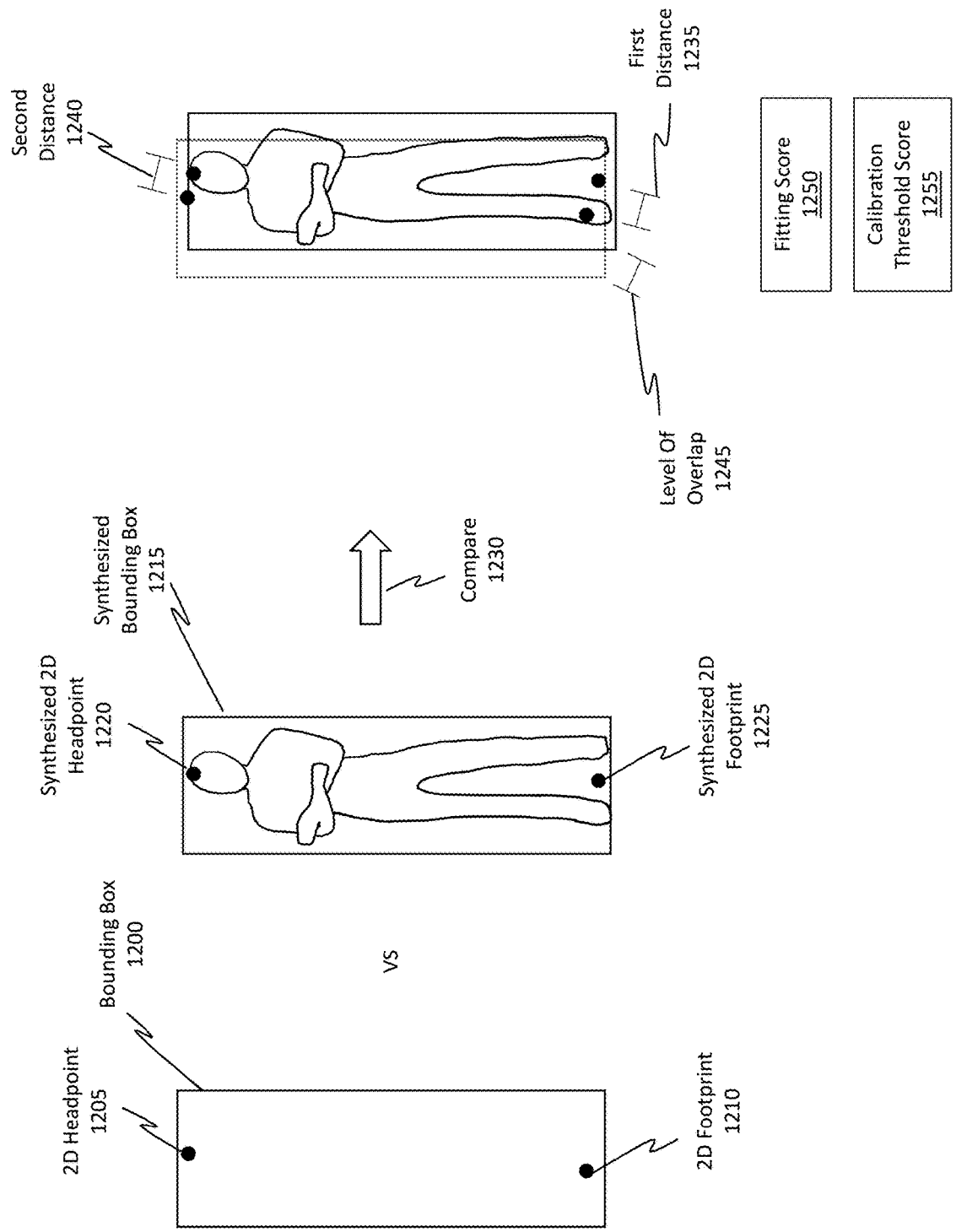
FIG. 12 illustrates how the locations of the synthesized headpoint and synthesized footprint can be compared against the locations of the original headpoint and footprint.

Based on the fitting score, the embodiments then either refrain from triggering a recalibration of the camera or, alternatively, trigger the recalibration of the camera. For example, in FIG. 2D, method 200 is shown as including an act 270 of comparing the fitting score against a predetermined calibration threshold score. Upon determining the fitting score meets or exceeds the predetermined calibration threshold score, act 275 involves refraining from triggering a recalibration of the camera. On the other hand, upon determining the fitting score does not meet or exceed the predetermined calibration threshold score, act 280 involves triggering the recalibration of the camera. FIG. 12 is representative of method acts 245 through 280.

FIG. 12 shows a bounding box 1200, a 2D headpoint 1205, and a 2D footprint 1210, which are representative of the bounding box 715, the headpoint 720, and the footprint 725 of FIG. 7 (i.e. the original pieces of data). FIG. 12 also shows a synthesized bounding box 1215, a synthesized 2D headpoint 1220, and a synthesized 2D footprint 1225, all of which are now in the 2D-space image plane. The synthesized 2D headpoint 1220 and synthesized 2D footprint 1225 are representative of the synthesized 2D headpoints and footprints mentioned thus far. The synthesized bounding box 1215 is generated after the reproject 1105 operation mentioned in FIG. 11 and is generated based on the synthesized 2D headpoint 1220, the synthesized 2D footprint 1225, and optionally any other points that were involved in the reproject operation. Notably, the synthesized bounding box 1215, the synthesized 2D headpoint 1220, and the synthesized 2D footprint 1225 are reprojected onto the actual low data image comprising the bounding box 1200, the 2D headpoint 1205, and the 2D footprint 1210, as shown on the right hand side of FIG. 12.

With that reprojection, the embodiments can now compare 1230 the synthesized data against the original data. For instance, the embodiments can compute a first distance 1235 between the synthesized 2D footprint 1225 and the 2D footprint 1210. The embodiments can compute a second distance 1240 between the synthesized 2D headpoint 1220 and the 2D headpoint 1205. The embodiments can also compute a level of overlap 1245 between the synthesized bounding box 1215 and the bounding box 1200. The first distance 1235, the second distance 1240, and the level of overlap 1245 can then be used to compute a fitting score 1250 which may be normalized and which is compared against a calibration threshold score 1255. As an example, the resulting fitting score 1250 may be normalized to a score between 0 and 100 (or perhaps any other normalizing range). The calibration threshold score 1255 can be a value within that normalized range, such as perhaps a score of 75. If the normalized fitting score is 75 or above, then the calibration is likely still valid. If the normalized fitting score is less than 75, then the calibration is likely no longer valid.

Optionally, the embodiments are able to generate and reproject multiple ground contact points, thereby generating multiple synthesized 2D footprints (e.g., one for the left foot and one for the right foot). In some embodiments, the computed first distance 1235 is performed by computing a first distance between a first one of the two synthesized ground contact points and the 2D footprint 1210 and then a second distance between the second one of the two synthesized ground contact points and the 2D footprint 1210. These two distances can then be averaged and compared to one another to determine whether the computed average lies within a threshold range of distances. Optionally, instead of using only a single 2D footprint 1210, the embodiments may identify two 2D footprints and then compare the two synthesized 2D footprints against the two 2D footprints. Distances between the left 2D footprint and the left synthesized 2D footprint and the right 2D footprint and the right synthesized 2D footprint may be determined, averaged, and then analyzed to determine whether the distances lie within a threshold range.

The computed distances and levels of overlap reflect whether or not the camera is out of calibration. If the distances are small and the level of overlap is high, then the camera likely still has an accurate calibration. On the other hand, if the distances are large and the level of overlap is small, then the camera likely is not calibrated. By way of additional clarification, if the camera still had an accurate calibration, then the modeled human should have characteristics closely matching the characteristics of the actual human that was detected because the modeled human was supposedly generated based on the center of mass of the actual human. If the calibration were off, however, then the modeled human would be different. Any differences can be used to infer that the camera's calibration is no longer valid and that the camera should be re-calibrated.

Figure 2D:

As recited in method acts 270, 275, and 280 of FIG. 2D, the embodiments can then either trigger a recalibration of the camera or can refrain from recalibrating the camera based on the comparison between the fitting score 1250 and the calibration threshold score 1255. It should be noted that both the initial calibration and any subsequent calibrations cause a set of intrinsic calibration parameters and extrinsic calibration parameters to be computed for the camera. The initial calibration and subsequent calibrations can also rely on determined characteristics of a human who is detected within an image generated by the camera.

Recall, the embodiments sample a number of images from the queue on which to perform the disclosed operations. The embodiments are able to average the computed fitting scores for all of the images and then use that computed average to compare against the calibration threshold score 1255. To further clarify, instead of comparing each image's corresponding fitting score, the embodiments are able to average all of the fitting scores together and then use this average score for the comparison. Therefore, refraining from calibration or, alternatively, calibrating the camera "based on the fitting score" may be performed based on a combined average of multiple fitting scores (in this case, that method act is still based on "the" fitting score because the fitting score is included in the average and thus influences the ultimate determination).

Although the discussion has focused on the use of humans serving as a calibration "target," one will appreciate that any object with known characteristics may be used. For instance, tables, lamps, pictures, televisions, animals, window frames, vehicles, and so forth may also be used provided their average characteristics can be determined. Accordingly, the embodiments are able to perform calibration checks and calibrations using objects of a known type.

Method acts 210 through 280 of method 200 constitute a process for automatically testing or checking the validity and accuracy of a camera's calibration. Acts 210 through 215 can be performed perpetually to ensure up-to-date images are retained in the queue.

Acts 220 through 280 can be triggered based on a determined time scale that is used to determine when the check is to be performed. As discussed earlier, any time scale may be used. Often, the time scale is at least one hour. Typically, the time scale is around every 24 hours (i.e. the acts 220 through 280 are triggered every 24 hours). The minimum time scale is dependent on the time it takes to refresh the queue with new low data images, such as filling the queue anew after a flushing event or such as filling the queue anew without flushing but simply waiting until all new low data images are present in the queue. One will appreciate how all of these operations may be performed automatically without human intervention.

In some embodiments, method 200 includes an additional step of notifying a system administrator when the calibration check reflects a scenario in which the camera's calibration is no longer valid. For example, an alert or notification may be sent to the administrator when the calibration is off. Additionally, alerts may be sent to the administrator even when the calibration check reflects the calibration is still valid. These alerts can be logged for auditing purposes so that a log of calibration checks can be maintained.

As will be discussed in more detail shortly, if the camera is triggered to perform a recalibration, then the embodiments may also compare a current image to a previous image (generated before calibration) in an attempt to identify by how much the camera moved or shifted. By identifying this shift, the embodiments can then dynamically and automatically adjust any "2D rules" that may have been previously in place (e.g., by shifting their position based on the camera's new position). Further details on "2D rules" will be provided momentarily.

Methods for Inferring Events

Figure 13A:
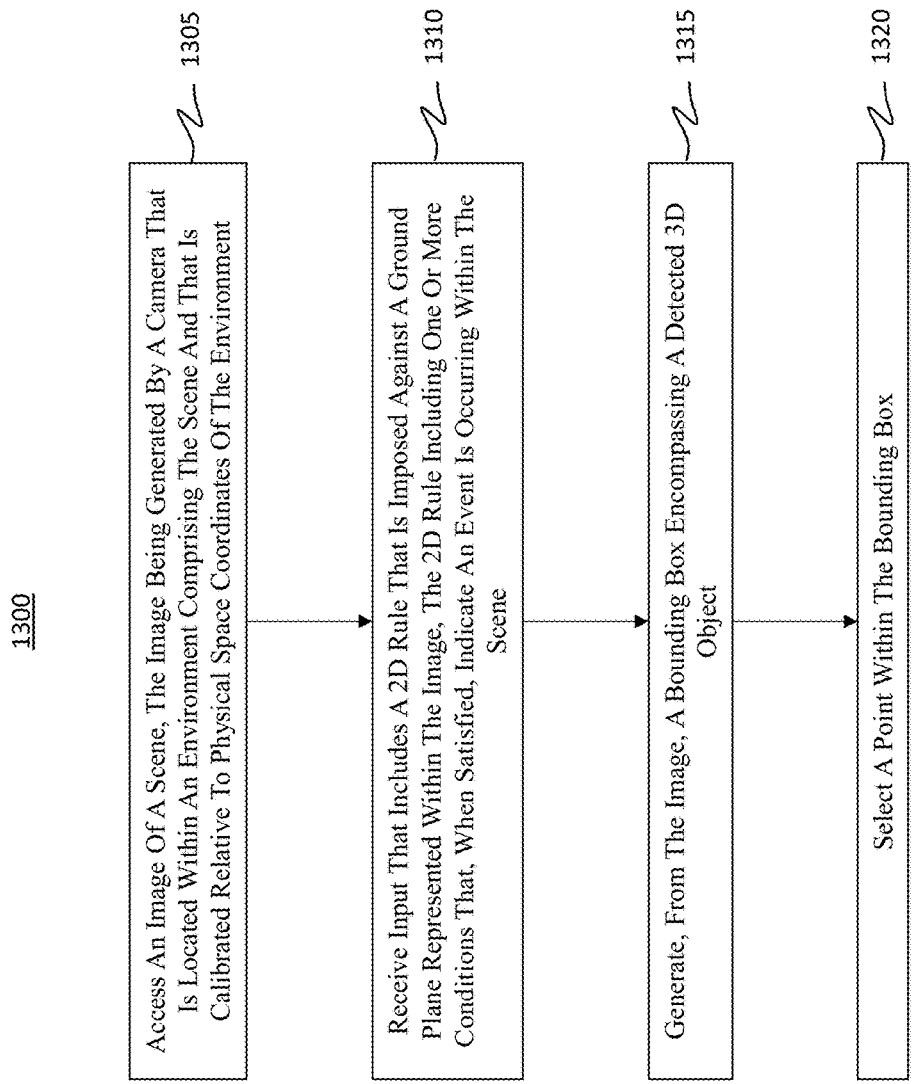
FIGS. 13A and 13B illustrate a method for inferring whether an event is occurring in a scene of an environment using images generated by a calibrated camera.
Figure 13B:
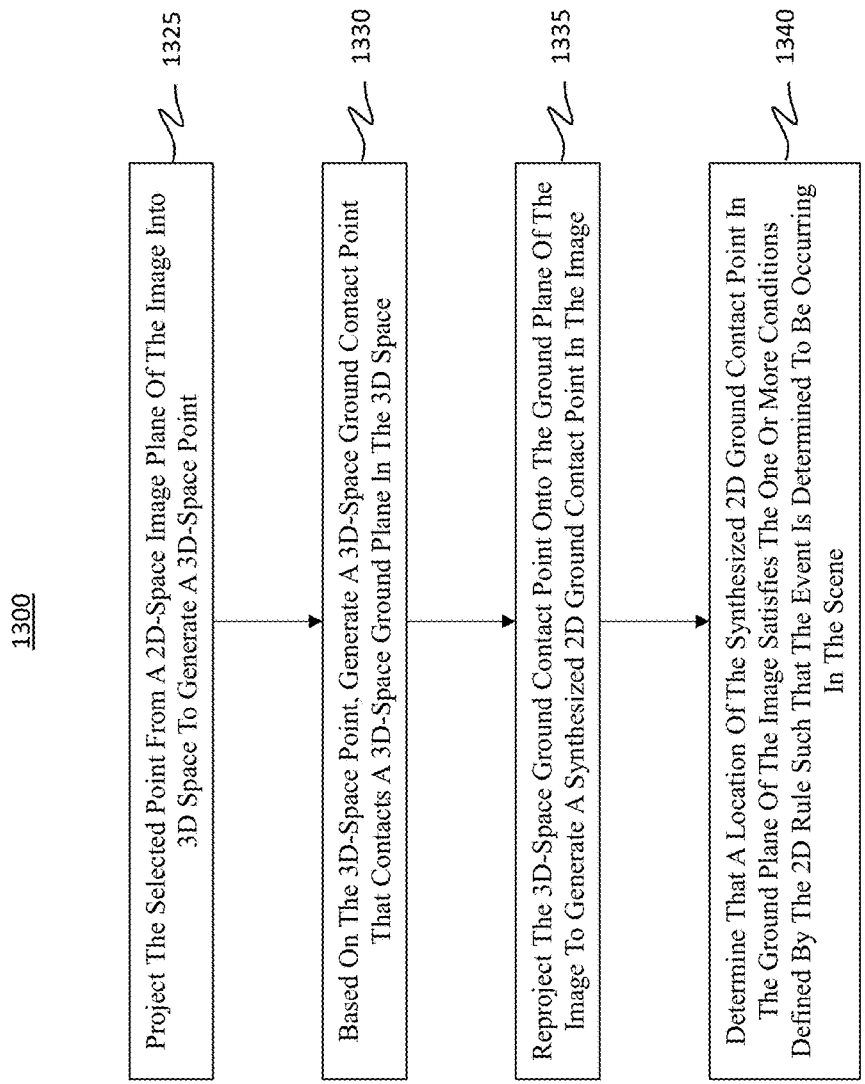
Figure 14:
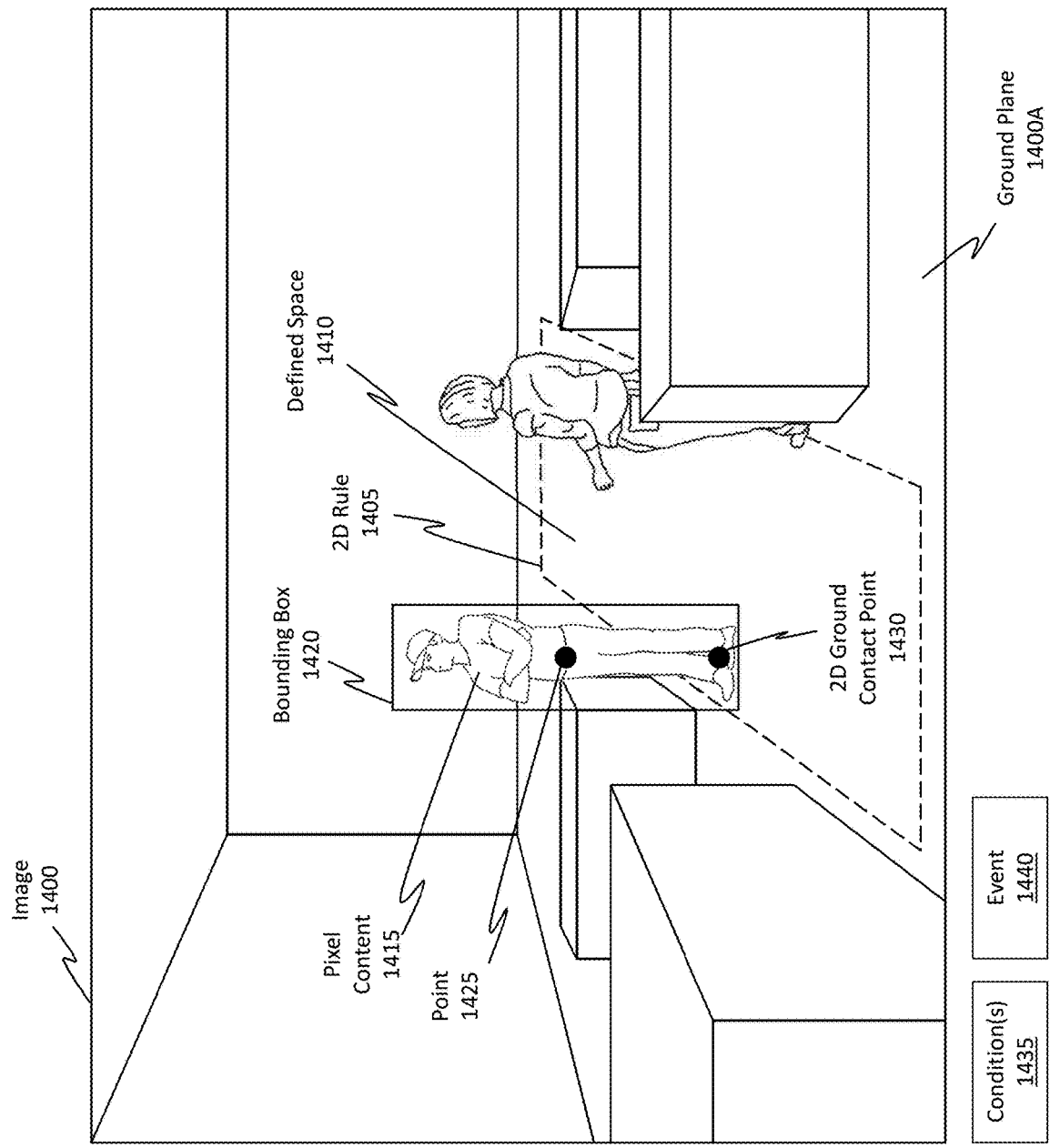
FIG. 14 illustrates how a 2D rule can be drawn on the ground plane of an image and how the embodiments are able to determine whether the conditions of the 2D rule are satisfied.
Figure 15:
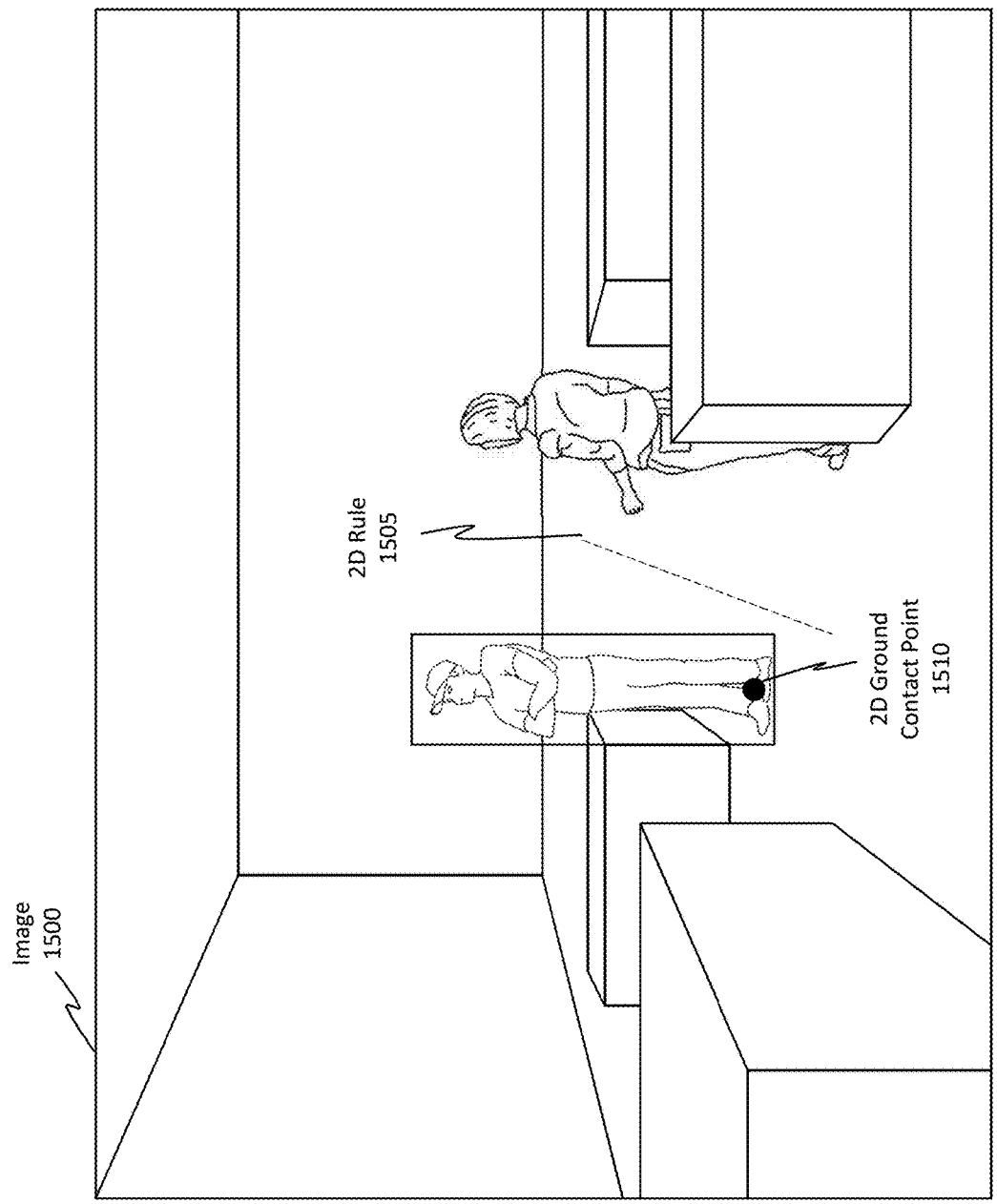
FIG. 15 illustrates another example of a 2D rule.
Figure 16:
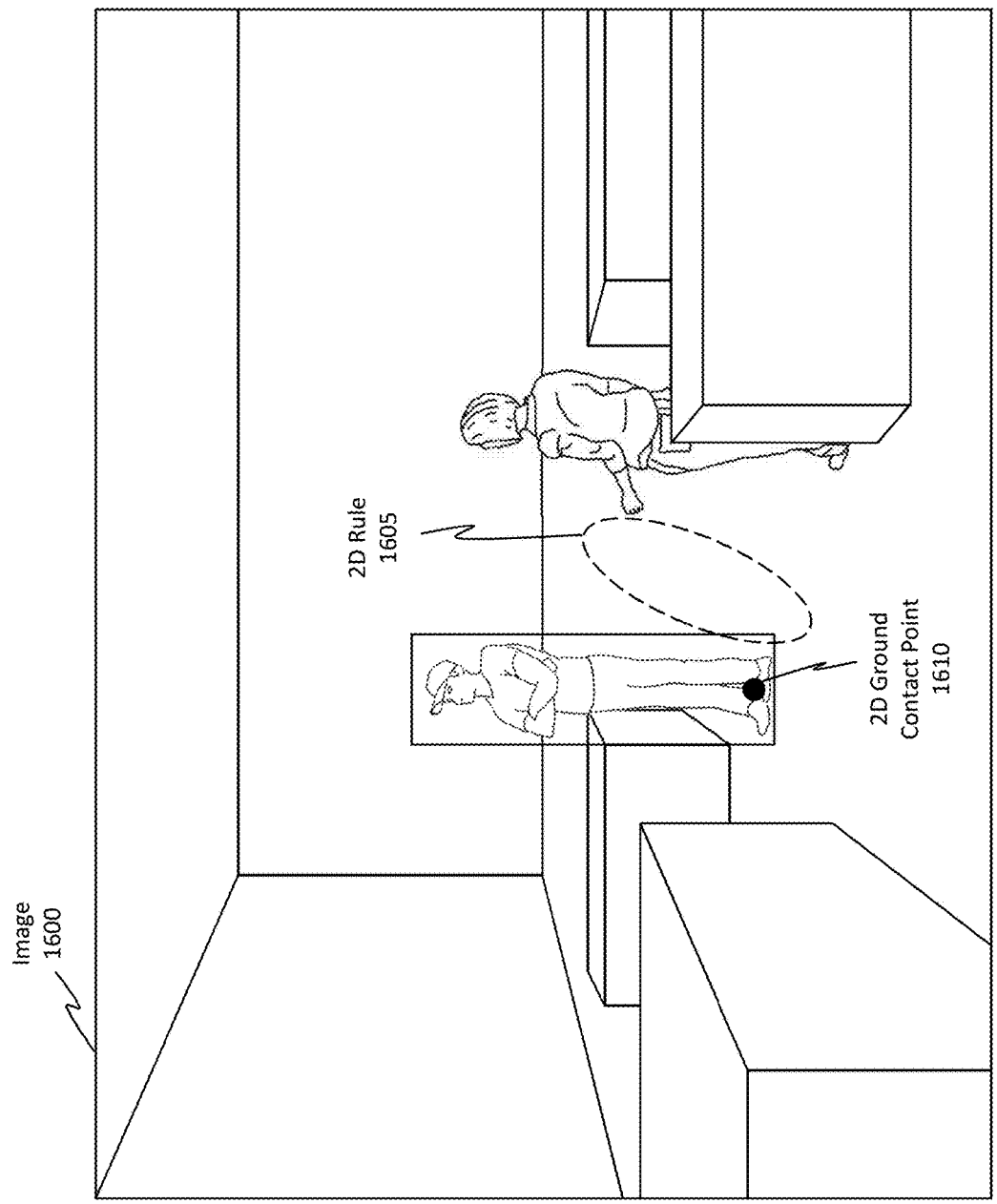
FIG. 16 illustrates another example of a 2D rule.

Attention will now be directed to FIGS. 13A and 13B, which focus on a flowchart of an example method 1300 for inferring whether an event is occurring in 3D space based on 2D image data. Method 1300 may be performed by a camera computing system that includes the calibrated camera mentioned in the initial portion of this disclosure. FIGS. 14, 15, and 16 provide additional context for method 1300.

Initially, method 1300 includes an act (act 1305) of accessing an image of a scene. The image is generated by a camera that is located within environment comprising the scene and that is calibrated relative to physical space coordinates of the environment, as was discussed in connection with method 200 of FIGS. 2A-2D. For example, FIG. 14 shows an example image 1400 that is representative of the image in act 1305.

In FIG. 13A, method 1300 also includes an act (act 1310) of receiving input. Here, the input defines or includes a so-called "2D rule" that is imposed against a ground plane represented within the image. Notably, the 2D rule defines or includes one or more conditions that, when satisfied, indicate an event is occurring within the scene. By way of example, FIG. 14 shows a 2D rule 1405 that has been drawn relative to a ground plane 1400A represented within the image (e.g., the floor). In this scenario, the 2D rule 1405 is a polygon that defines a defined space 1410. The conditions of this 2D rule 1405 state that an event is occurring if a human is located within the defined space 1410 (e.g., the event is, therefore, presence of a human).

Relatedly, FIG. 15 shows an example image 1500 and another 2D rule 1505, which is a line drawn relative to the ground plane. That is, in some implementations, the 2D rule includes a line that is drawn on the ground plane of the image. In this scenario, it may be the case that the one or more conditions of the 2D rule 1505 state that the event is occurring in the scene when the 2D ground contact point 1510 is located on a particular side of the line or, alternatively, when the 2D ground contact point 1510 is contacting the line.

Furthermore, FIG. 16 shows an example image 1600 and another 2D rule 1605, which is an oval that encompasses a defined space and that is also drawn relative to the ground plane. That is, in some implementations, the 2D rule includes a shape (e.g., an oval) that is drawn on the ground plane of the image. Here, the one or more conditions of the 2D rule 1605 state that the event is occurring in the scene when the 2D ground contact point 1610 is located within a space defined by the shape.

Returning to FIG. 13A, method 1300 also includes an act (act 1315) of generating, from the image, a bounding box that encompasses a detected 3D object. Stated differently, act 1315 includes generating a bounding box within the image. This bounding box encompasses content representative of a detected 3D object that is located within the scene. This bounding box is similar to the bounding boxes mentioned thus far. Furthermore, the detected 3D object may be a human. For example, FIG. 14 shows pixel content 1415 representative of a human. A bounding box 1420 has been generated to encompass the pixels corresponding to that human. Although only a single bounding box 1420 is illustrated in FIG. 14, one will appreciate how the embodiments are able to generate any number of bounding boxes for any number of detected humans.

In FIG. 13A, act 1320 then involves selecting a point within the bounding box. In some cases, the selected point may be a central point of the bounding box, where the central point may correspond to an abdominal region of the human. Alternatively, the selected point may be a different point encompassed by the bounding box, such as perhaps a headpoint. That is, in scenarios where the 3D object is a human located within the scene, then the selected point of the bounding box can be one of: i) a central point of the bounding box corresponding to an abdominal location of the human or ii) a headpoint of the bounding box corresponding to a head location of the human. FIG. 14 shows how point 1425 has been selected. Later on, the disclosure will discuss what may occur when the human is partially occluded.

Method 1300 continues in FIG. 13B with an act (act 1325) of projecting the selected point from a 2D-space image plane of the image into 3D space to generate a 3D-space point. With reference to both FIGS. 8 and 14, the disclosed embodiments are able to project the point 1425 of FIG. 14 in the same manner that was disclosed with reference to FIG. 8. Specifically, in FIG. 8, the point 810 (which now corresponds to the point 1425) is projected (e.g., project 815) from the 2D-space image plane 805 into 3D space 820 to form the 3D-space point 825.

Based on the 3D-space point, act 1330 in FIG. 13B involves generating a 3D-space ground contact point that contacts a 3D-space ground plane in the 3D space. With reference to FIGS. 8, 9, and 10, the embodiments are able to generate a model (e.g., a human model) in order to determine where the 3D-space ground contact point is to be located based on the 3D-space point. For example, FIG. 9 shows how the 3D virtual object 915 is generated based on the 3D-space point 900 and further shows how the 3D-space footprint 925 is generated and contacts the 3D-space ground plane 910. Such operations may be performed in accordance with the disclosure presented for FIGS. 8, 9, and 10.

Generating the 3D-space ground contact point may be performed using height characteristics for an average human body and using the height characteristics to generate a model representative of a human body. This model may comprise feet that contact the 3D-space ground plane to form the 3D-space ground contact point or that influence where the 3D-space ground contact point is (e.g., perhaps it is between the two modeled feet). Furthermore, generating the 3D-space ground contact point may be further based on calibration parameters of the calibrated camera.

In FIG. 13B, act 1335 then includes reprojecting the 3D-space ground contact point onto the ground plane of the image to generate a synthesized 2D ground contact point in the image. FIG. 11 shows a reproject 1105 operation in which the 3D-space points 1100 (including a 3D-space ground contact point) are reprojected from 3D space into the 2D-space image plane 1110 to form at least the synthesized 2D footprint 1120, which is representative of the 2D ground contact point in act 1335. Whereas the operations of FIG. 11 resulted in the points being reprojected into the low data image, the operations of FIG. 14 and method 1300 result in the points being reprojected into the high data original image (e.g., image 1400 and not a low data image). In FIG. 14, the 2D ground contact point 1430 is also representative of the 2D ground contact point in act 1335.

In FIG. 13B, act 1340 includes determining that a location of the synthesized 2D ground contact point in the ground plane of the image satisfies the one or more conditions defined by or included within the 2D rule. As a consequence, the event is determined to be occurring in the scene. By way of example, FIG. 14 shows how the 2D ground contact point 1430 is included within the defined space 1410 formed from the 2D rule 1405. If the one or more conditions (e.g., conditions 1435) of the 2D rule 1405 specify that the event (e.g., event 1440) is occurring if the 2D ground contact point 1430 is included within the defined space 1410, then the conditions are satisfied and the event is determined to be occurring. On the other hand, if the conditions specify the event is occurring if the 2D ground contact point 1430 is outside of the defined space 1410, then the event will not be occurring based on the situation presented in FIG. 14.

With reference to FIG. 15, suppose the conditions of the 2D rule 1505 indicate an event is occurring if the 2D ground contact point 1510 is located on the left-hand side of the 2D rule 1505. In the scenario presented in FIG. 15, the event is determined to be occurring. Alternatively, suppose the conditions indicate that the event is occurring if the 2D ground contact point 1510 crosses the 2D rule 1505 over a period of time, as determined via the analysis of multiple images collected over time. If the 2D ground contact point 1510 were to perpetually stay to the left of the 2D rule 1505, then the event would not be determined to be occurring. Drawing a line 2D rule, such as the 2D rule 1505, enables the system to essentially count the number of crossings that occur and thus can be used to count how many humans are present. In other words, the 2D rule can be provided to count a number of objects that cross the line drawn on the ground plane.

The 2D rule 1605 of FIG. 16 can be configured in a manner similar to that of the 2D rule 1405 of FIG. 14. That is, the space defined by the oval can be used as the basis for the conditions of the rule.

Figure 17:
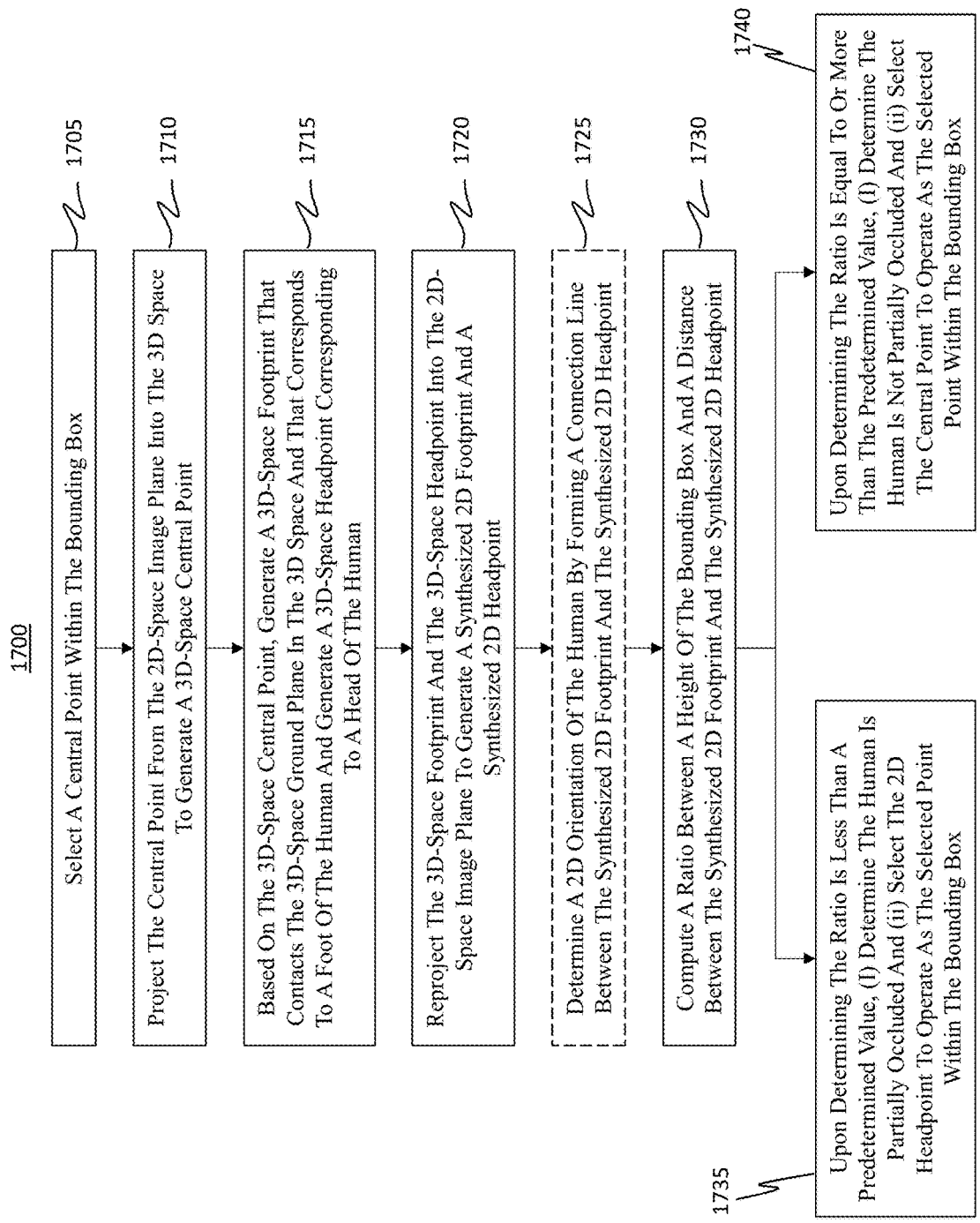
FIG. 17 illustrates an example technique for determining whether a human is occluded by another object in the scene of the environment.
Figure 18:
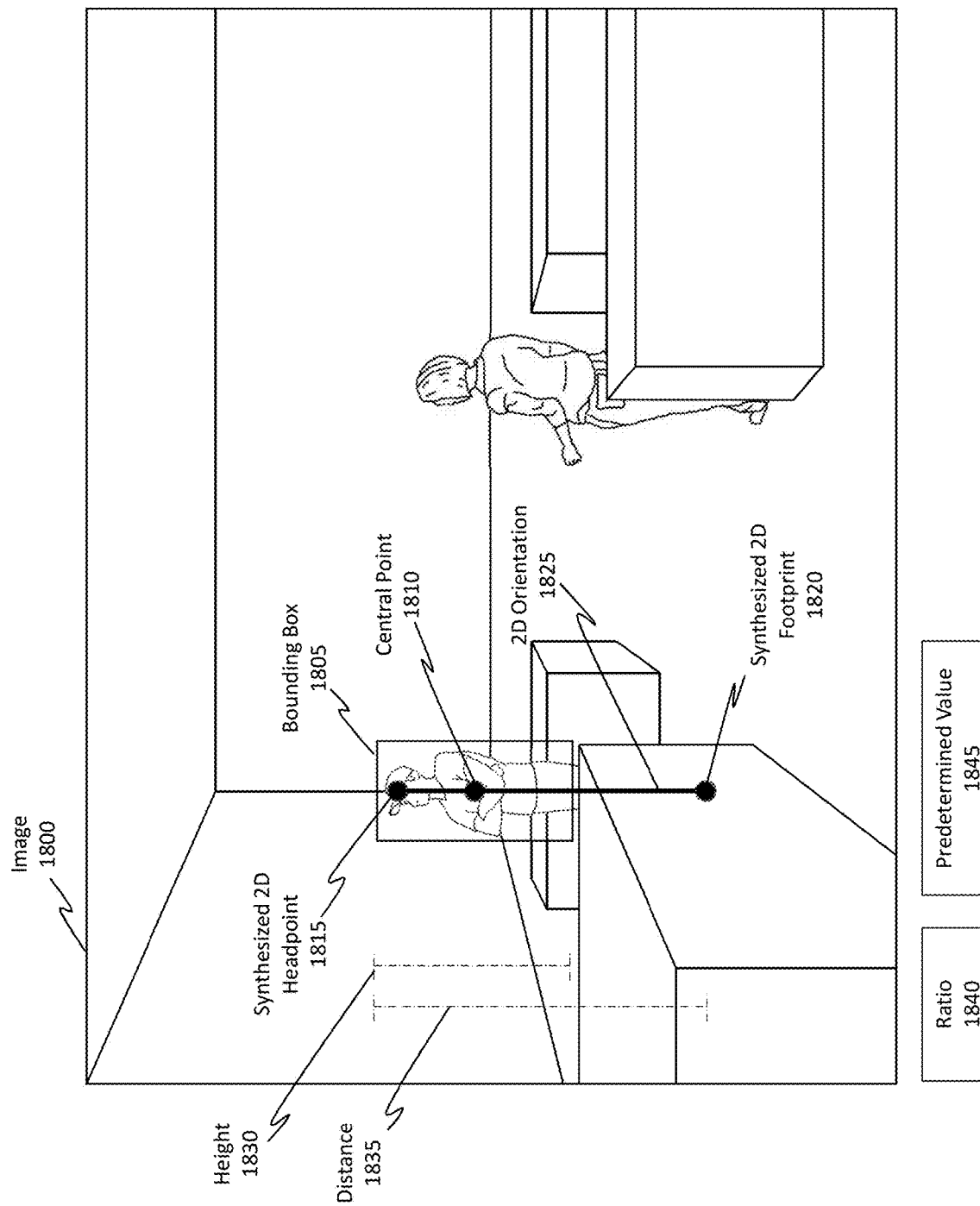
FIG. 18 illustrates an example scenario in which a human is occluded.

FIG. 17 illustrates a flowchart of an example method 1700 for determining whether or not the detected human is partially occluded by another object in the scene. The acts of method 1700 can be used to supplement act 1320 of FIG. 13A, which is focused on selecting a point within the bounding box. To clarify, selecting the point within the bounding box (e.g., act 1320) can include the acts of method 1700. In this scenario, it should be noted that the detected object in the image recited in act 1305 of method 1300 is a detected human. Additionally, FIG. 18 is provided to help supplement the discussion of method 1700.

Prior to selecting the point within the bounding box (e.g., act 1320 of method 1300), there may be an act of determining whether the human is partially occluded by another object in the scene. This determination is performed by the acts illustrated in FIG. 17. Furthermore, FIG. 18 illustrates an example image 1800 with a bounding box 1805. Notice, the human male, who is encompassed in the bounding box 1805, is occluded by an object (e.g., a countertop). Notice also, the height of the bounding box 1805 does not seemingly capture the human's legs.

Initially, method 1700 includes an act (act 1705) of selecting a central point within the bounding box. FIG. 18 illustrates this act via the central point 1810, which is the central point to the bounding box 1805 (but is not the central abdominal area of the human male).

Act 1710 involves projecting the central point from the 2D-space image plane into the 3D space to generate a 3D-space central point. Such operations have been discussed in detail and will not be repeated.

Based on the 3D-space central point, act 1715 involves generating a 3D-space footprint that contacts the 3D-space ground plane in the 3D space and that corresponds to a foot of the human and further involves generating a 3D-space headpoint corresponding to a head of the human. Again, these operations have been discussed in detail previously.

Act 1720 includes reprojecting the 3D-space footprint and the 3D-space headpoint into the 2D-space image plane to generate a synthesized 2D footprint and a synthesized 2D headpoint. Again, these operations have already been discussed. FIG. 18 shows a synthesized 2D headpoint 1815 and a synthesized 2D footprint 1820. Notice, the synthesized 2D footprint 1820 is currently out of the bounds of the bounding box 1805 because the model generation process generated the human based on human characteristics associated with the central point 1810 and those characteristics resulted in the synthesized 2D footprint 1820 being outside of the bounding box 1805.

Optionally, act 1725 includes determining a 2D orientation or stance of the human by forming a connection line between the synthesized 2D footprint and the synthesized 2D headpoint. FIG. 17 shows this act in a dotted line to show how it is an optional act. FIG. 18 shows the 2D orientation 1825 by connecting a line between the synthesized 2D headpoint 1815 and the synthesized 2D footprint 1820.

Method 1700 then includes an act (act 1730) of computing a ratio between a height of the bounding box and a distance between the synthesized 2D footprint and the synthesized 2D headpoint. FIG. 18 shows a height 1830, which represents the height of the bounding box 1805, and a distance 1835, which represents a distance between the synthesized 2D headpoint 1815 and the synthesized 2D footprint 1820. The ratio 1840 refers to the ratio between the height 1830 and the distance 1835.

Upon determining the ratio is less than a predetermined value, act 1735 in FIG. 17 includes (i) determining the human is partially occluded and (ii) selecting the 2D headpoint to operate as the selected point within the bounding box. Alternatively, upon determining the ratio is equal to or more than the predetermined value, act 1740 includes (i) determining the human is not partially occluded and (ii) selecting the central point to operate as the point within the bounding box.

FIG. 18 shows how the ratio 1840 may be compared against the predetermined value 1845. If the ratio 1840 is less than the predetermined value 1845, then the human is occluded (as illustrated in FIG. 18), and the embodiments select the headpoint 520 from FIG. 5 to operate as the "selected point" in act 1320 of FIG. 13. On the other hand, if the ratio 1840 is equal to or more than the predetermined value 1845, then the human is not occluded, and the embodiments select the central point (e.g., point 1425 of FIG. 14) to operate as the "selected point" in act 1320. The predetermined value 1845 may be any ratio value, such as 0.8, 0.9, 1.0, or any value therebetween. These values mean that the ratio 1840 indicates the height 1830 is perhaps 80% of the distance 1835 (or vice versa), 90%, or 100%.

Elevated Rules

Figure 19:
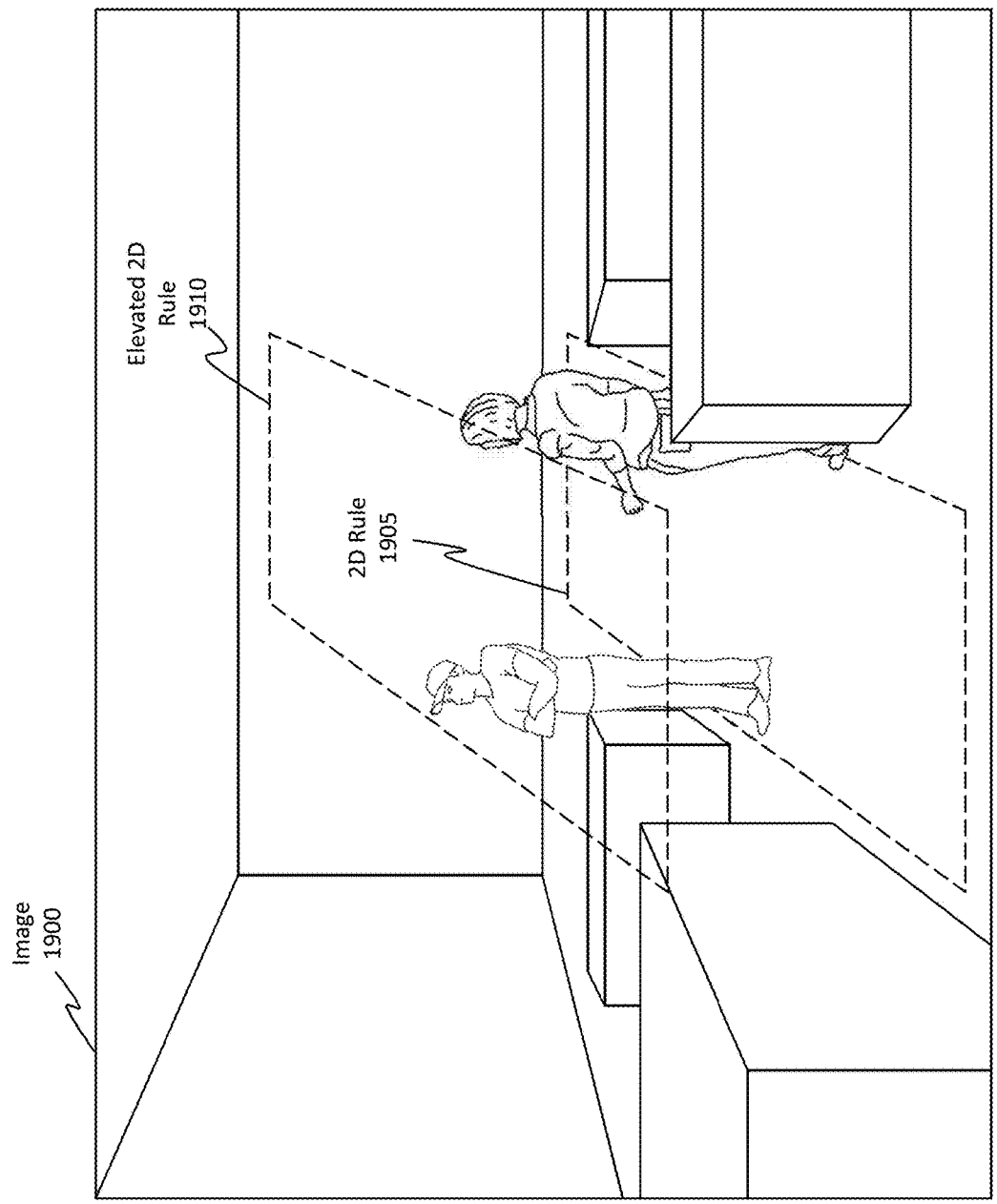
FIG. 19 illustrates how a 2D rule can be elevated.

FIG. 19 illustrates an image 1900 and a 2D rule 1905 that has been drawn on the image 1900 relative to the ground plane. Optionally, the 2D rule includes one of a line, an oval, a polygon, or any other shape. FIG. 19 also shows how the ground-based 2D rule 1905 can be elevated above the ground plane, as represented by the elevated 2D rule 1910.

To generate the elevated 2D rule 1910, which is elevated relative to the 2D rule and relative to the ground plane, a number of operations are performed. One operation involves projecting the 2D rule 1905 into the 3D space to generate a particular rule in 3D space. This kind of projecting operation has been discussed in detail throughout this disclosure.

Another operation involves elevating the particular rule from a current position in 3D space (e.g., on the ground plane) to an elevated position in 3D space. Optionally, the elevated position in 3D space may correspond to a height of an average human head above the 3D-space ground plane (or perhaps some other height). By elevating the rule to this height, the embodiments can track head placement within a scene. By elevating the rule to different heights, different events can be tracked.

Another operation involves reprojecting the particular rule, which is now elevated, into the 2D-space image plane. Finally, the embodiments display the elevated reprojected particular rule simultaneously with the 2D rule. For example, the elevated 2D rule 1910 is shown as being displayed simultaneously with the 2D rule 1905.

As discussed earlier, if the camera performs a recalibration, then the embodiments can also compare a current image to a previous image (generated before calibration) in an attempt to identify by how much the camera moved or shifted. By identifying this shift, the embodiments can then dynamically and automatically adjust any 2D rules that were previously in place (e.g., by shifting their position based on the camera's new position). For instance, if the camera was bumped, the 2D rule 1905 may momentarily be in the wrong position. Currently, it is positioned in the aisle between the two sets of counters. If the camera position shifted, the 2D rule 1905 may have also shifted to an incorrect position (e.g., perhaps overlapping one of the counters as opposed to being in the aisle). By recalibrating and then comparing images, the embodiments can reset the position of the 2D rule 1905 to its correct position based on the analysis of the previous image that correctly placed the 2D rule.

Using Buffer Zones to Determine Whether Conditions of a Rule are Satisfied

Figure 20:
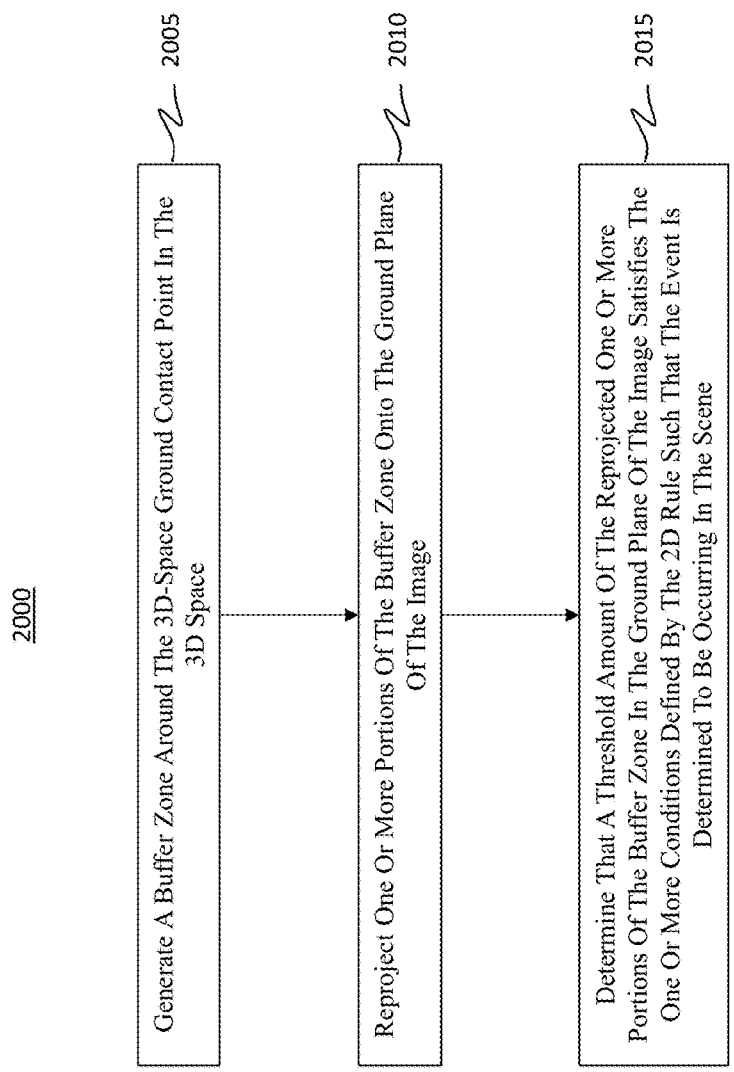
FIG. 20 illustrates a flowchart of an example method for building a buffer zone around a ground contact point to help determine whether the conditions of the 2D rule are satisfied.

Attention will now be directed to FIG. 20, which illustrates another method 2000 for inferring whether an event is occurring in the 3D space based on 2D image data. The initial acts of method 2000 are the same as method 1300 of FIGS. 13A and 13B. Specifically, act 1305, act 1310, act 1315, act 1320, act 1325, and act 1330 are the same for method 2000 and thus will not be repeated in FIG. 20. Accordingly, method act 2005 of FIG. 20 follows method act 1330 of method 1300. From there, methods 2000 and 1300 diverge.

Figure 21:
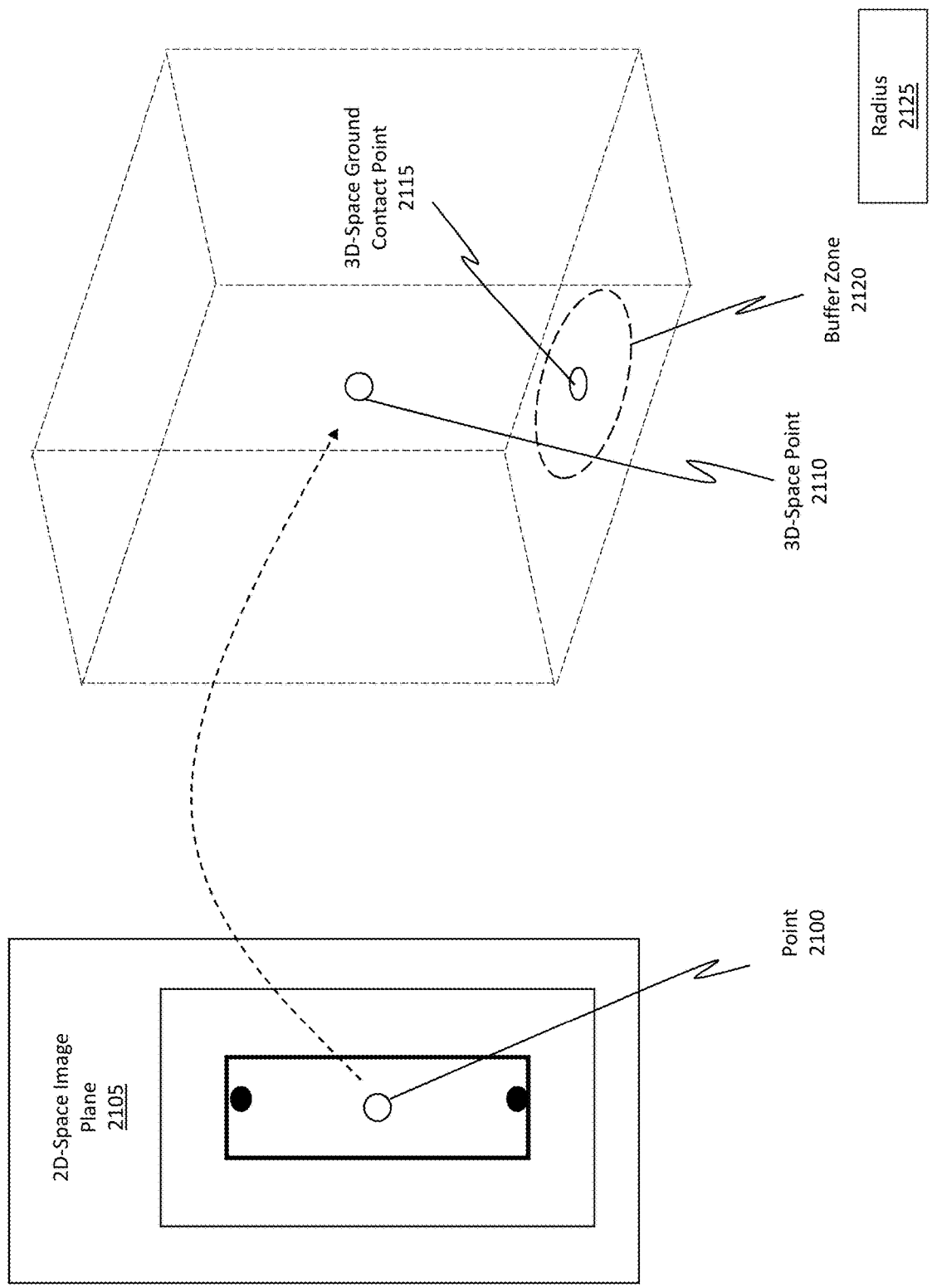
FIG. 21 illustrates how the buffer zone can be generated.
Figure 22:
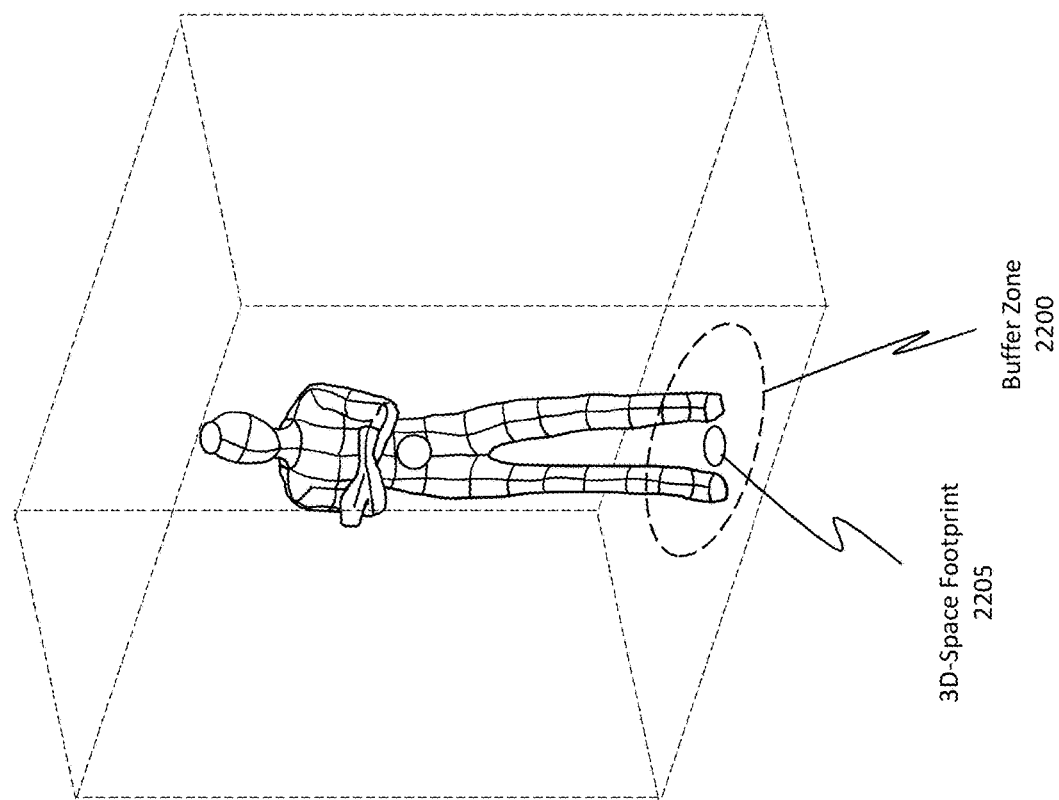
FIG. 22 illustrates another view of how the buffer zone can be generated.

Method 2000 includes an act (act 2005) of generating a buffer zone around the 3D-space ground contact point. For example, FIG. 21 shows an example of a point 2100 in the 2D-space image plane 2105. The point 2100 is projected into 3D space to form the 3D-space point 2110. From the 3D-space point 2110, the 3D-space ground contact point 2115 is generated, in accordance with the principles discussed earlier. In addition to those operations, a buffer zone 2120 is generated on the 3D ground plane around the 3D-space ground contact point 2115. Optionally, the buffer zone 2120 may be in the form of an oval having a predetermined radius 2125. Example lengths for the radius 2125 include, but certainly are not limited to, lengths of 0.2 meters (m), 0.3 m, 0.4 m, 0.5 m, 0.6 m. 0.7 m, 0.8 m, 0.9 m, 1.0 m, 1.1 m, 1.2 m, 1.3 m, 1.4 m, 1.5 m, and more than 1.5 m. Of course, other shapes may be used as the buffer zone 2120 besides just an oval, even asymmetric shapes may be used. FIG. 22 provides an alternative illustration in which a buffer zone 2200 is generated around a 3D-space footprint 2205.

Returning to FIG. 20, there is then an act (act 2010) of reprojecting one or more portions of the buffer zone onto the ground plane of the image. This reprojection operation is performed in a similar manner as has already been discussed.

Then, there is an act (act 2015) of determining that a threshold amount of the reprojected one or more portions of the buffer zone in the ground plane of the image satisfies the one or more conditions defined by or included within the 2D rule. As a consequence, the event is determined to be occurring in the scene.

Figure 23:
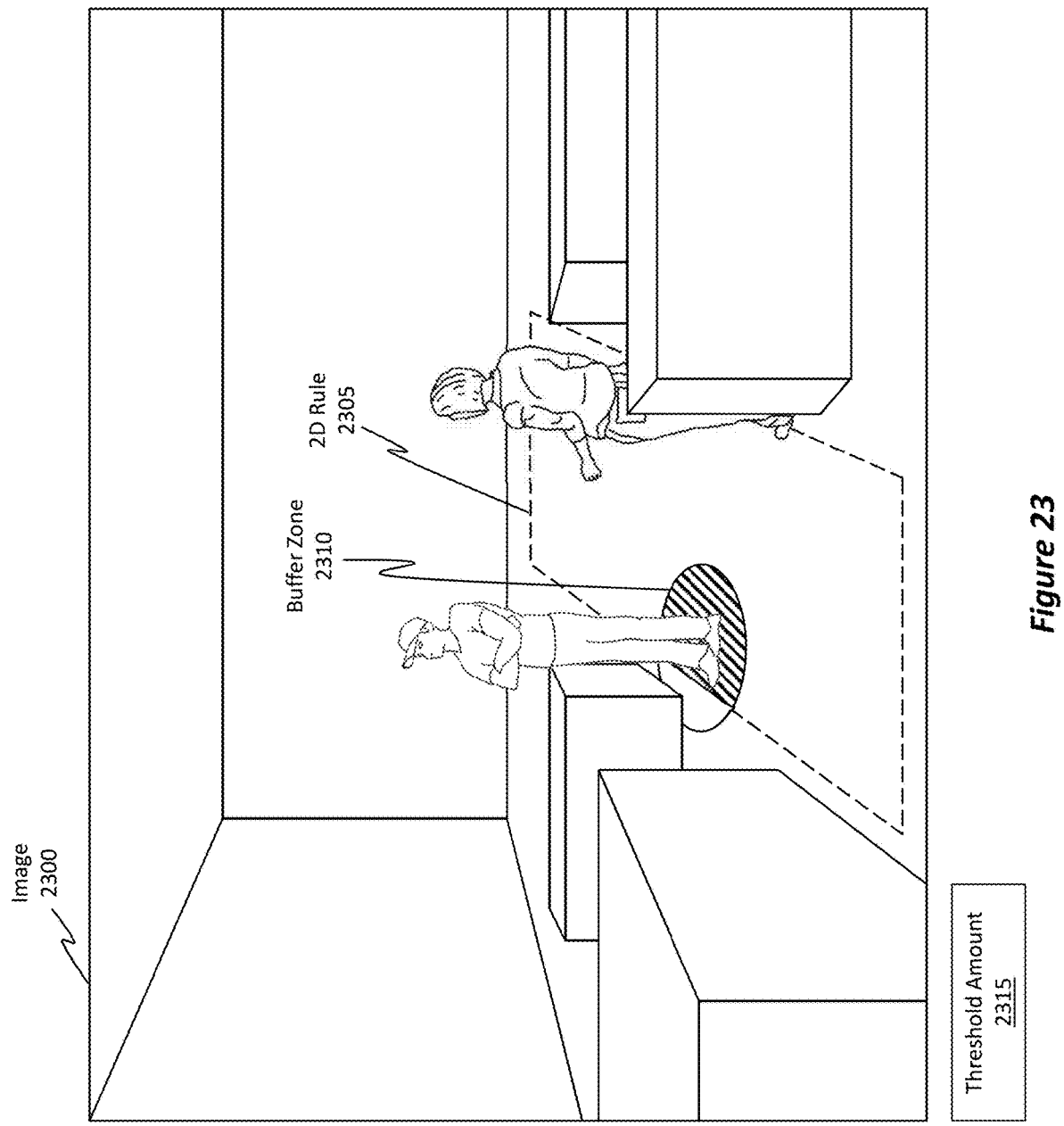
FIG. 23 shows how the buffer zone is used to determine whether the 2D rule is satisfied.
Figure 24:
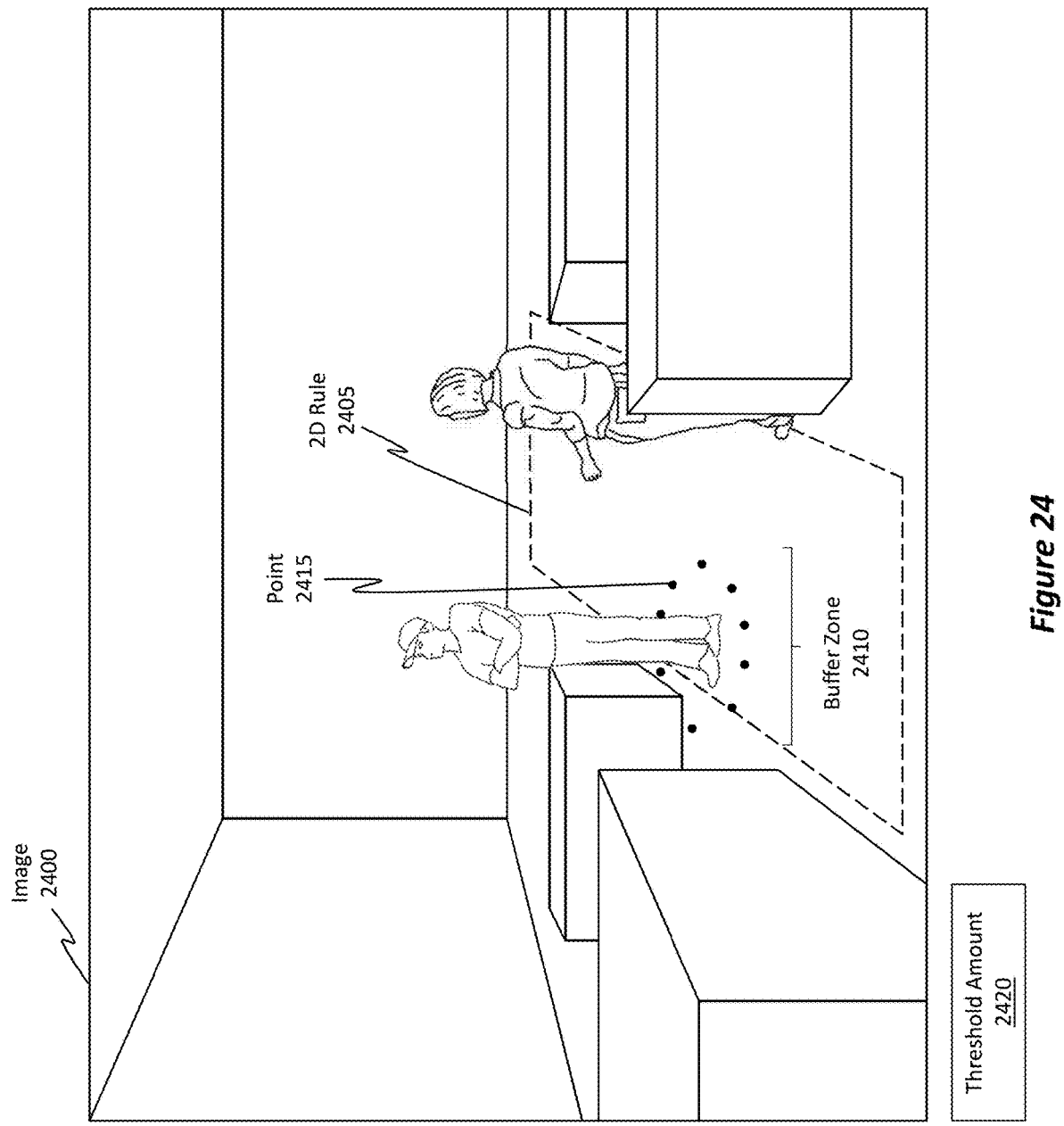
FIG. 24 provides another view of illustrating how the buffer zone can be used.

By way of example, suppose the 2D rule includes a shape that is drawn on the ground plane of the image. Here, the one or more conditions of the 2D rule can state that the event is occurring in the scene when the threshold amount of the reprojected one or more portions of the buffer zone is located within a space defined by the shape. Of course, the threshold amount may be set to any value. Example values include, but are not limited, to 1-100% (e.g., perhaps 50%) of the reprojected buffer zone. FIGS. 23 and 24 are representative of acts 2010 and 2015.

FIG. 23 shows an example image 2300 in which a 2D rule 2305 has been drawn on. Additionally, image 2300 shows how a reprojected buffer region has been reprojected from 3D space into the 2D-space image plane, as represented by the buffer zone 2310. Notice, the shaded portion of the buffer zone 2310 is included within the space defined by the 2D rule 2305 while the unshaded portion of the buffer zone 2310 is outside of the defined space. If a threshold amount 2315 of the buffer zone 2310 is included in the defined space, then the embodiments determined that the conditions defined by the 2D rule 2305 are satisfied. Examples of the threshold amount 2315 include, but are not limited to, a particular percentage value of the buffer zone 2310. For example, the threshold amount 2315 may require at least 20% of the buffer zone 2310 be included in the defined space. In some cases, the threshold amount 2315 may require 1%, 10%, 20%, 30%, 40%, 50%, 60%, 70%, 80%, 90%, or even 100% (or any value therebetween).

FIG. 24 shows an alternative option. Specifically, FIG. 24 shows an example image 2400 with a 2D rule 2405. In this scenario, instead of reprojecting the entirety of the buffer zone into the 2D-space image plane, the embodiments reprojected only an outer perimeter portion of the buffer zone, as shown by the dots of buffer zone 2410. More specifically, the embodiments reproject specific outer perimeter points (e.g., point 2415) forming the outer perimeter of the buffer zone 2410 (e.g., the reprojected portions of the buffer zone comprise a selected number of points disposed around an outer perimeter of the oval). In this case, the threshold amount 2420 may correspond to a number of points (e.g., point 2415) that are included within the defined space formed by the 2D rule 2405. Of course, if a line or other shape were used as the 2D rule 2405, then other conditions may be used to determine whether the event is occurring. Here, the threshold amount 2420 may dictate that a certain number of the points are required to satisfy the conditions.

By way of example, the threshold amount 2420 may require 1, 2, 3, 4, 5, 6, 7, 8 or more than 8 points to satisfy the 2D rule 2405 (e.g., they are included within the defined space). In the example shown in FIG. 24, seven out of nine total points are included in the defined space. Accordingly, a buffer zone may be used to gauge or determine whether the conditions of a 2D rule are satisfied.

Additional Methods for Inferring Events

Figure 25:
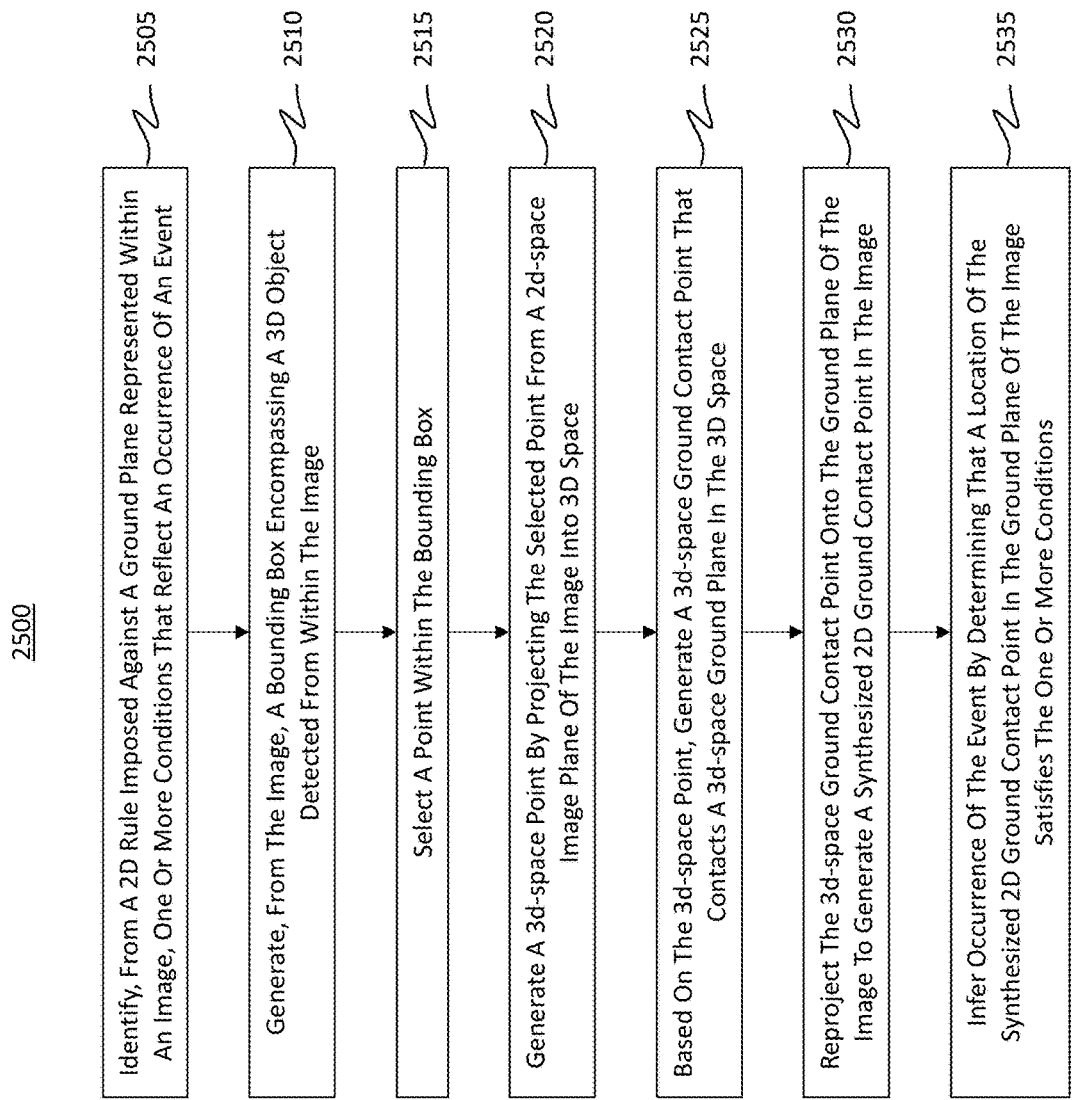
FIG. 25 illustrates another flowchart of an example method for inferring the occurrence of an event.

Attention will now be directed to FIG. 25, which illustrates a flowchart of an example method 2500 for inferring the occurrence of an event based on one or more conditions detected within a 3D space, where the conditions are identified based on 2D image data. Method 2500 is similar to method 1300 from FIGS. 13A and 13B but can be viewed as a sort-of "run time" set of operations.

Initially, method 2500 includes an act (act 2505) if identifying, from a 2D rule imposed against a ground plane represented within an image, one or more conditions that reflect an occurrence of an event. Act 2510 then involves generating, from the image, a bounding box encompassing a 3D object detected from within the image. The bounding boxes discussed thus far are representative of this bounding box. Additionally, act 2515 includes selecting a point within the bounding box.

In act 2520, a 3D-space point is generated by projecting the selected point from a 2D-space image plane of the image into 3D space. Based on the 3D-space point, there is then an act (act 2525) of generating a 3D-space ground contact point that contacts a 3D-space ground plane in the 3D space.

The 3D-space ground contact point is then reprojected (in act 2530) onto the ground plane of the image to generate a synthesized 2D ground contact point in the image. The occurrence of the event is then inferred (in act 2535) by determining that a location of the synthesized 2D ground contact point in the ground plane of the image satisfies the one or more conditions.

Example Computer/Computer Systems

Attention will now be directed to FIG. 26 which illustrates an example computer system 2600 that may include and/or be used to perform any of the operations described herein. Computer system 2600 may take various different forms. For example, computer system 2600 may be embodied as a tablet, a desktop, a laptop, a mobile device, a camera system, or a standalone device, such as those described throughout this disclosure. Computer system 2600 may also be a distributed system that includes one or more connected computing components/devices (e.g., cameras) that are in communication with computer system 2600.

In its most basic configuration, computer system 2600 includes various different components. FIG. 26 shows that computer system 2600 includes one or more processor(s) 2605 (aka a "hardware processing unit"), input/output (I/O) 2610, camera sensor(s) 2615, and storage 2620.

Regarding the processor(s) 2605, it will be appreciated that the functionality described herein can be performed, at least in part, by one or more hardware logic components (e.g., the processor(s) 2605). For example, and without limitation, illustrative types of hardware logic components/ processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

I/O 2610 can include any type of input and output device. Examples include a mouse, keyboard, touchscreen, monitor, and so forth.

Camera sensor(s) 2615 can include any type of camera. For instance, camera sensor(s) 2615 can include any type of thermal camera (or thermal imaging sensor), any type of visible light camera, and any type of depth detection camera.

Storage 2620 may be physical system memory, which may be volatile, non-volatile, or some combination of the two. The term "memory" may also be used herein to refer to non-volatile mass storage such as physical storage media. If computer system 2600 is distributed, the processing, memory, and/or storage capability may be distributed as well.

Storage 2620 is shown as including executable instructions (i.e. code 2625). The executable instructions represent instructions that are executable by the processor(s) 2605 of computer system 2600 to perform the disclosed operations, such as those described in the various methods.

The disclosed embodiments may comprise or utilize a special-purpose or general-purpose computer including computer hardware, such as, for example, one or more processors (such as processor(s) 2605) and system memory (such as storage 2620), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2600 may also be connected (via a wired or wireless connection) to external sensors (e.g., one or more remote cameras) or devices via a network 2630. For example, computer system 2600 can communicate with any number devices or cloud services to obtain or process data. In some cases, network 2630 may itself be a cloud network. Furthermore, computer system 2600 may also be connected through one or more wired or wireless networks 2630 to remote/separate computer systems(s) that are configured to perform any of the processing described with regard to computer system 2600.

A "network," like network 2630, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2600 will include one or more communication channels that are used to communicate with the network 2630. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system that infers whether an event is occurring using two-dimensional (2D) image data, said computer system comprising:
    at least one processor; and
    at least one hardware storage device that stores instructions that are executable by the at least one processor to cause the computer system to:
        access an image of a scene;
        access a 2D rule that is imposed against a ground plane of the image, the 2D rule comprising a condition that, when satisfied, indicates an event is occurring within the scene;
        generate, from the image, a bounding box encompassing a detected object that is included in the image;
        select a point within the bounding box;
        project the selected point from a 2D-space image plane of the image into three-dimensional (3D) space to generate a 3D-space point;
        based on the 3D-space point, determine a 3D-space ground contact point that contacts a 3D-space ground plane in the 3D space;
        generate a buffer comprising the 3D-space ground contact point;
        reproject at least a portion of the buffer from the 3D space to the ground plane of the image; and
        determine that a location of the reprojected portion of the buffer relative to the ground plane of the image satisfies the condition such that the event is determined to be occurring in the scene.

2. The computer system of claim 1, wherein the 2D rule includes a line that is drawn on the ground plane of the image, and
    wherein the condition of the 2D rule states that the event is occurring in the scene when the 2D ground contact point is located on a particular side of the line or, alternatively, when the 2D ground contact point is contacting the line.

3. The computer system of claim 1, wherein the 2D rule includes a shape that is drawn on the ground plane of the image, and
    wherein the condition of the 2D rule states that the event is occurring in the scene when the 2D ground contact point is located within a space defined by the shape.

4. The computer system of claim 1, wherein the 3D object is a human located within the scene, and wherein the selected point of the bounding box is one of:
    a central point of the bounding box corresponding to an abdominal location of the human; or
    a headpoint of the bounding box corresponding to a head location of the human.

5. The computer system of claim 4, wherein generating the 3D-space ground contact point is performed using height characteristics for an average human body and using the height characteristics to generate a model representative of a human body comprising feet that contact the 3D-space ground plane to form the 3D-space ground contact point.

6. The computer system of claim 1, wherein generating the 3D-space ground contact point is further based on calibration parameters of a camera that generated the image.

7. The computer system of claim 1, wherein the 3D object is a human, and wherein execution of the instructions further causes the computer system to:
    prior to selecting the point within the bounding box, determine whether the human is partially occluded by another object in the scene by performing the following:
        select a central point within the bounding box;
        project the central point from the 2D-space image plane into the 3D space to generate a 3D-space central point;
        based on the 3D-space central point, generate a 3D-space footprint that contacts the 3D-space ground plane in the 3D space and that corresponds to a foot of the human and generate a 3D-space headpoint corresponding to a head of the human;
        reproject the 3D-space footprint and the 3D-space headpoint into the 2D-space image plane to generate a synthesized 2D footprint and a synthesized 2D headpoint;
        compute a ratio between a height of the bounding box and a distance between the synthesized 2D footprint and the synthesized 2D headpoint;
        upon determining the ratio is less than a predetermined value, (i) determine the human is partially occluded and (ii) select the 2D headpoint to operate as the selected point within the bounding box; and
        upon determining the ratio is equal to or more than the predetermined value, (i) determine the human is not partially occluded and (ii) select the central point to operate as the point within the bounding box.

8. The computer system of claim 1, wherein the 2D rule includes one of a line, an oval, or a polygon, and wherein execution of the instructions further causes the computer system to:
generate an elevated 2D rule that is elevated relative to the 2D rule and relative to the ground plane by performing the following:
project the 2D rule into the 3D space to generate a particular rule in 3D space;
elevate the particular rule from a current position in 3D space to an elevated position in 3D space;
reproject the particular rule, which is now elevated, into the 2D-space image plane; and
display the reprojected particular rule simultaneously with the 2D rule.

9. The computer system of claim 8, wherein the elevated position in 3D space corresponds to a height of an average human head above the 3D-space ground plane.

10. A method for inferring whether an event is occurring in three-dimensional (3D) space based on two-dimensional (2D) image data, said method comprising:
accessing an image of a scene, the image being generated by a camera that is located within an environment comprising the scene and that is calibrated relative to physical space coordinates of the environment;
receiving input comprising a 2D rule that is imposed against a ground plane represented within the image, the 2D rule comprising one or more conditions that, when satisfied, indicate an event is occurring within the scene;
generating a bounding box within the image, the bounding box encompassing content representative of a detected 3D object that is located within the scene;
selecting a point within the bounding box;
projecting the selected point from a 2D-space image plane of the image into 3D space to generate a 3D-space point;
based on the 3D-space point, generating a 3D-space ground contact point that contacts a 3D-space ground plane in the 3D space;
generating a buffer zone around the 3D-space ground contact point;
reprojecting one or more portions of the buffer zone onto the ground plane of the image; and
determining that a threshold amount of the reprojected one or more portions of the buffer zone in the ground plane of the image satisfies the one or more conditions such that the event is determined to be occurring in the scene.

11. The method of claim 10, wherein the 2D rule includes a shape that is drawn on the ground plane of the image, and
wherein the one or more conditions of the 2D rule state that the event is occurring in the scene when the threshold amount of the reprojected one or more portions of the buffer zone is located within a space defined by the shape.

12. The method of claim 11, wherein the threshold amount of the reprojected one or more portions of the buffer zone is at least 50% of the reprojected one or more portions of the buffer zone.

13. The method of claim 11, wherein the buffer zone that is generated in the 3D space is an oval with a predetermined radius.

14. The method of claim 13, wherein the reprojected one or more portions of the buffer zone comprise a selected number of points disposed around an outer perimeter of the oval.

15. The method of claim 10, wherein the 2D rule includes a line that is drawn on the ground plane of the image,
wherein the one or more conditions of the 2D rule state that the event is occurring in the scene when the 2D ground contact point is located on a particular side of the line, and
wherein the 2D rule is provided to count a number of objects that cross the line drawn on the ground plane.

16. The method of claim 10, wherein the 3D object is a human, and wherein the method further includes:
prior to selecting the point within the bounding box, determine whether the human is partially occluded by another object in the scene by performing the following:
select a central point within the bounding box;
project the central point from the 2D-space image plane into the 3D space to generate a 3D-space central point;
based on the 3D-space central point, generate a 3D-space footprint that contacts the 3D-space ground plane in the 3D space and that corresponds to a foot of the human and generate a 3D-space headpoint corresponding to a head of the human;
reproject the 3D-space footprint and the 3D-space headpoint into the 2D-space image plane to generate a synthesized 2D footprint and a synthesized 2D headpoint;
determine a 2D orientation of the human by forming a connection line between the synthesized 2D footprint and the synthesized 2D headpoint;
compute a ratio between a height of the bounding box and a distance between the synthesized 2D footprint and the synthesized 2D headpoint;
upon determining the ratio is less than a predetermined value, (i) determine the human is partially occluded and (ii) select the 2D headpoint to operate as the selected point within the bounding box;
upon determining the ratio is equal to or more than the predetermined value, (i) determine the human is not partially occluded and (ii) select the central point to operate as the point within the bounding box.

17. A method for inferring occurrence of an event based on two dimensional (2D) image data, said method comprising:
identifying, from a 2D rule imposed against a ground plane represented within an image, a condition that, when satisfied, reflects an occurrence of an event;
generating, from the image, a bounding box encompassing an object detected from within the image;
selecting a point within the bounding box;
generating a three-dimensional (3D)-space point by projecting the selected point from a 2D-space image plane of the image into 3D space;
based on the 3D-space point, determining a 3D-space ground contact point that contacts a 3D-space ground plane in the 3D space;
generating a buffer that comprises the 3D-space ground contact point;
reprojecting at least a portion of the buffer from the 3D space to the ground plane of the image; and
inferring occurrence of the event by determining that a location of the reprojected portion of the buffer relative to the ground plane of the image satisfies the condition.

* * * * *